(12) United States Patent
Momonoi et al.

(10) Patent No.: US 8,401,273 B2
(45) Date of Patent: Mar. 19, 2013

(54) APPARATUS FOR EVALUATING DEGRADATION OF PATTERN FEATURES

(75) Inventors: Yoshinori Momonoi, Clifton Park, NY (US); Atsuko Yamaguchi, Tokyo (JP); Taro Osabe, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 508 days.

(21) Appl. No.: 12/691,534

(22) Filed: Jan. 21, 2010

(65) Prior Publication Data

US 2011/0176718 A1 Jul. 21, 2011

(51) Int. Cl.
*G06K 9/00* (2006.01)
(52) U.S. Cl. ........................... 382/145; 382/147
(58) Field of Classification Search .......... 382/141–151; 356/237.1–237.6, 239.3, 239.7
See application file for complete search history.

(56) References Cited

U.S. PATENT DOCUMENTS

| | | |
|---|---|---|
| 6,441,398 B2 | 8/2002 | Yang et al. |
| 6,724,947 B1 | 4/2004 | Hayes |
| 7,200,833 B2 | 4/2007 | Izuha et al. |
| 7,398,178 B2 | 7/2008 | Kang |
| 2005/0275850 A1 | 12/2005 | Bischoff et al. |
| 2009/0046896 A1 | 2/2009 | Yamaguchi et al. |
| 2009/0114816 A1 | 5/2009 | Tam et al. |

OTHER PUBLICATIONS

Diaz et al. "An Experimentally Validated Analytical Model for Gate Line-Edge Roughness (LER) Effects on Technology Scaling", IEEE Electron Device Letters, vol. 22, No. 6, Jun. 2001, pp. 287-289.
Habermas et al., "Contact Hole Edge Roughness: Circles vs. Stars", Proceedings of SPIE vol. 5375, pp. 337-345.
Oldiges et al., "Modeling Line Edge Roughness Effects in Sub 100 Nanometer Gate Length Devices", IEEE Proceedings, Sep. 2000, pp. 131-134.
Yamaguchi et al., "Evaluation of Line-Edge Roughness in Cu/low-k Interconnect Patterns with CD-SEM", 2009 IEEE Proceedings, Feb. 2009, pp. 225-227.
Yamaguchi et al., "Characterization of Line-Edge Roughness in Cu/Low-k Interconnect Pattern", Japanese Journal of Applied Physics, vol. 47, No. 4, 2008, pp. 2501-2505.

*Primary Examiner* — Tri T Ton
(74) *Attorney, Agent, or Firm* — Miles & Stockbridge P.C.

(57) ABSTRACT

A measurement tool apparatus for evaluating degradation of pattern features in a semiconductor device manufacturing process. The measurement tool apparatus detects variations in the patterns from SEM images thereof and extracts pattern edge points along the circumference of each pattern. The measurement tool apparatus compares the pattern edge points to corresponding edge points of an ideal shape so as to determine deviation of the patterns. Metrics are derived from analysis of the deviations. The measurement tool apparatus uses the metrics in calculating an index representative of the geometry of edge spokes of the pattern, an indicator of the orientation of the edge spokes, and/or anticipated effects of the edge spokes on device performance.

13 Claims, 20 Drawing Sheets

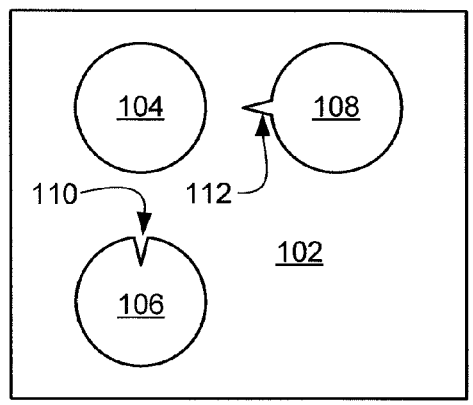
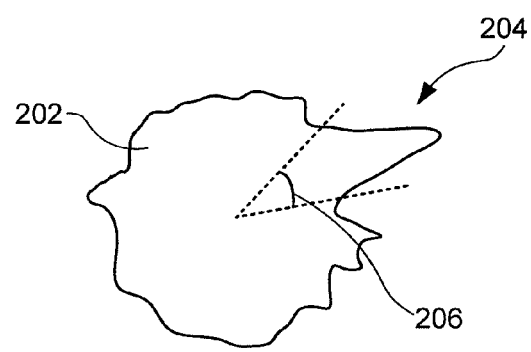
FIG. 1  FIG. 2
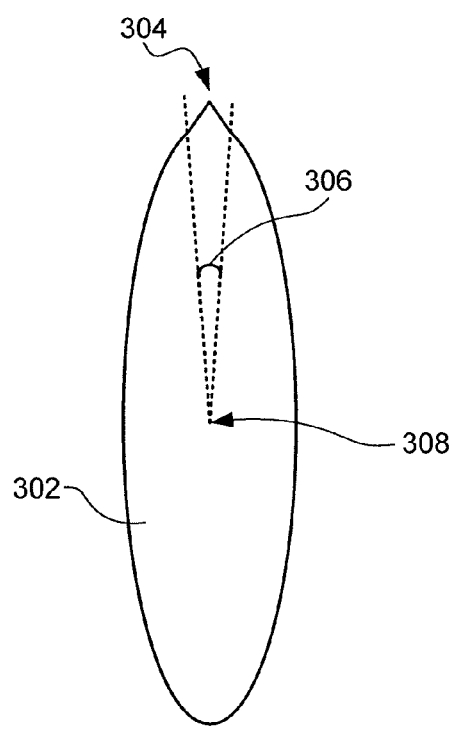
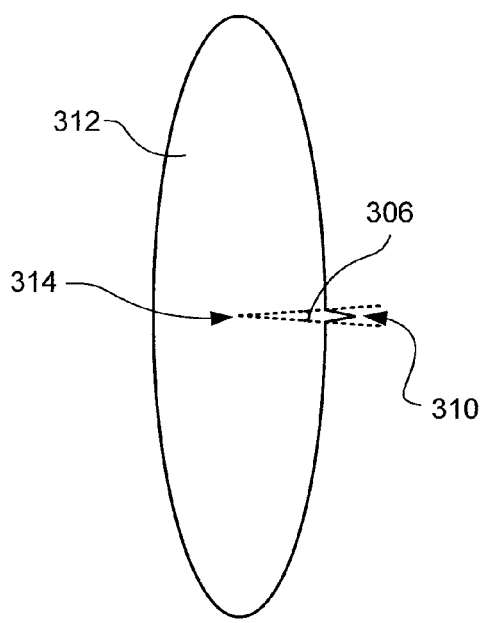
FIG. 3  FIG. 4

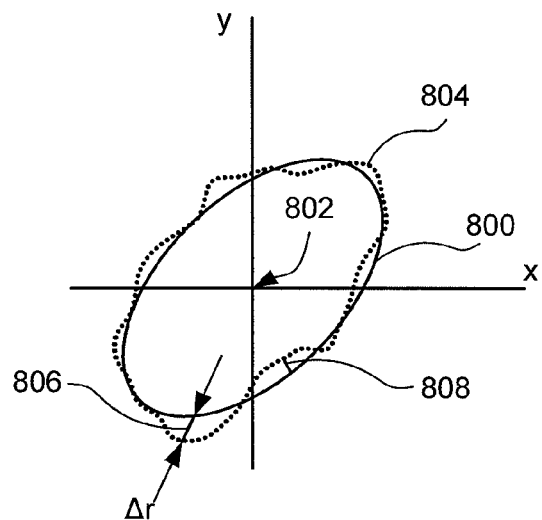
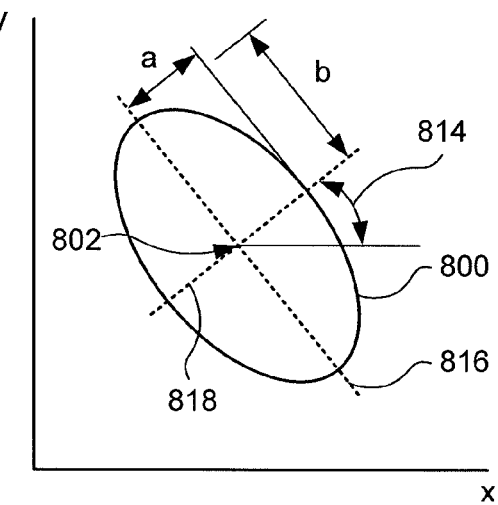
FIG. 8A          FIG. 8B
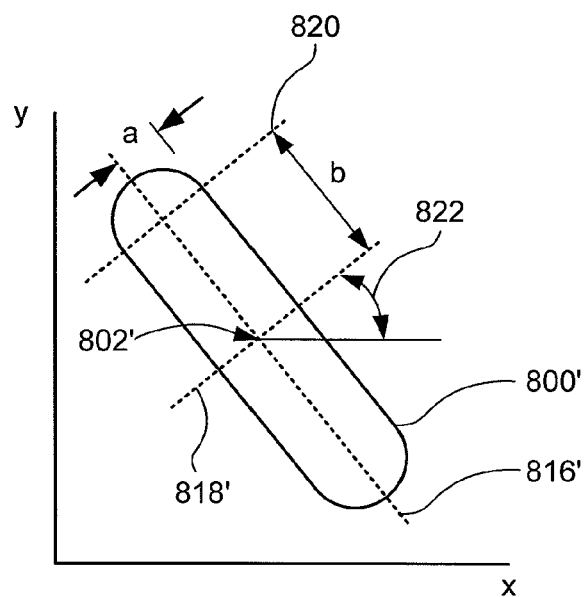
FIG. 8C

APPARATUS FOR EVALUATING DEGRADATION OF PATTERN FEATURES

TECHNICAL FIELD

The present application relates generally to measurement and evaluation of pattern features from images thereof, and, more particularly, to systems, methods, and devices for evaluating closed two-dimensional pattern features, for example, semiconductor device pattern features, from electron microscope images thereof.

BACKGROUND

A semiconductor manufacturing process forms one or more patterns on or in a substrate to form a semiconductor device. For example, photolithography transfers a pattern from a mask to photoresist on the substrate, thereby resulting in a photoresist pattern which serves as a template for subsequent material addition or removal steps in the formation of the semiconductor device. Because of variations in the semiconductor manufacturing process, the resulting pattern on/in the substrate may not always correspond sufficiently to the desired pattern. Variations in the resulting pattern may adversely affect device performance, especially when alignment and/or spacing between sub-millimeter scale features is important. For quality control purposes, feature sizes of a pattern are measured after forming of the pattern on/in the substrate to verify that the pattern satisfies desired tolerances. Such size measurements include, for example, measuring a width of a line pattern or a diameter of a hole pattern.

In order to evaluate size information of the formed patterns, images of the patterns after formation may be analyzed, for example, by extracting edges of the patterns and measuring a dimension of the pattern based on the extracted edges. When manufacturing semiconductor devices having small feature sizes (e.g., less than 1 μm), the images may be obtained using an imaging device sufficiently powerful to resolve the individual features of the pattern. For example, a scanning electron microscope (SEM) is used to obtain plan view images of the formed patterns.

For larger size features, the size measurements may focus on determining a dimension (e.g., width, length, diameter, etc.) of the formed pattern. Variations and/or roughness along the edge of the pattern may thus be trivial compared to the overall dimension of the pattern. For example, a 10-nm edge roughness for a 100-μm wide line pattern may be a relatively insignificant deviation. However, as feature sizes decrease, even minute variations introduced by edge surface roughness may result in a significant deviation in ideal device performance. For example, a 10-nm edge roughness for a 50-nm diameter hole pattern may be a relatively significant deviation. The measurement of formed patterns may thus include a measurement of edge roughness as well as pattern dimension. When applied to hole or dot patterns, the edge roughness is termed hole edge roughness. When applied to a small contact hole or dot patterns (e.g., with feature sizes less than 50 nm), the edge roughness is termed contact edge roughness (CER).

SUMMARY

Embodiments of the present invention address the above-mentioned problems and limitations, among other things.

In embodiments, a measurement tool apparatus, which detects variations in hole or dot pattern features, extracts pattern-edge points along a pattern's circumference. The apparatus then calculates deviations of the pattern from a designed shape using the extracted edge points. Analyzing the deviations for a particular pattern yields one or more metrics for the pattern. Based on the one or more metrics, the apparatus calculates an index representative of the geometry of edge spokes of the pattern and/or the anticipated effect of edge spokes on device performance.

In embodiments, a system for evaluating a hole pattern in a semiconductor device pattern includes an image processing module and a pattern evaluation module. The image processing module extracts position information of an edge of the hole pattern from a critical dimension SEM (CD-SEM) image of the semiconductor device pattern. The pattern evaluation module fits a shape to points on the edge of the pattern and determines a deviation for each of the points from a corresponding point on an edge of the fitted shape. The pattern evaluation module also calculates a height index and a width index based on the determined deviations and a concavity parameter based on the extracted position information. The pattern evaluation module further calculates a roughness metric for the hole pattern based on the calculated height index and width index.

In embodiments, a system evaluates a semiconductor device pattern, which includes a hole pattern. The system includes a CD-SEM, an image processing module and a pattern evaluation module. At least one of the modules is integrated with the CD-SEM. The image processing module extracts position information of an edge of the hole pattern from a CD-SEM image of the semiconductor device pattern. The pattern evaluation module quantifies deviations of the edge of the hole pattern from an edge of an ideal shape fitted to the hole pattern. The pattern evaluation module also calculates a height index and a width index associated with the hole pattern based on the quantified deviations. In addition, the pattern evaluation module determines an electric field concentration for the hole pattern based on the calculated height index and width index.

In embodiments, a system for evaluating a hole pattern includes an image processing module and a pattern evaluation module. The image processing module extracts edge information of the hole pattern from a CD-SEM image. The edge information includes positions of a plurality of points on an edge of the hole pattern. The pattern evaluation module quantifies a difference in the position of each of the plurality of points from a position of a corresponding point on an edge of an ideal shape fitted to the hole pattern. The pattern evaluation module also calculates a height index and a width index associated with the hole pattern based on the quantified differences. In at least one embodiment, the height index is equal to $$3\sqrt{\sum_{i=1}^{m} \frac{\Delta r_i^2}{m(m-1)}},$$

where m is the number of points on the edge of the hole pattern and $\Delta r_i$ is the quantified difference for each said point. The width index is a length, $\xi$, for which an autocorrelation function applied to the deviation in a height direction along the circumference of the ideal shape has a value of 0.2. The pattern evaluation module also computes a roughness metric for the hole pattern based on the calculated height index and width index. The roughness metric is one of a sharpness parameter, which is equal to the height index divided by the width index, and an electric field concentration for the hole pattern.

BRIEF DESCRIPTION OF THE DRAWINGS

The foregoing and other aspects, features, and advantages of the present invention will be better appreciated from the following description of embodiments, considered with reference to the accompanying drawings, wherein:

FIG. 1 is a diagram showing a number of hole patterns with edge roughness;

FIG. 2 is a diagram showing a close-up view of a single hole pattern with edge roughness;

FIG. 3 is a diagram showing an elliptical hole pattern with a spoke at a distance far from the center of the elliptical hole pattern;

FIG. 4 is a diagram showing an elliptical hole pattern with a spoke at a distance near to the center of the elliptical hole pattern;

FIG. 8A is a schematic diagram of an elliptical hole pattern with an ideal elliptical hole pattern overlaid thereon;

FIG. 8B is a schematic diagram of an ideal elliptical hole pattern;

FIG. 8C is a schematic diagram of an ideal non-elliptical hole pattern;

DETAILED DESCRIPTION

Figure 5:
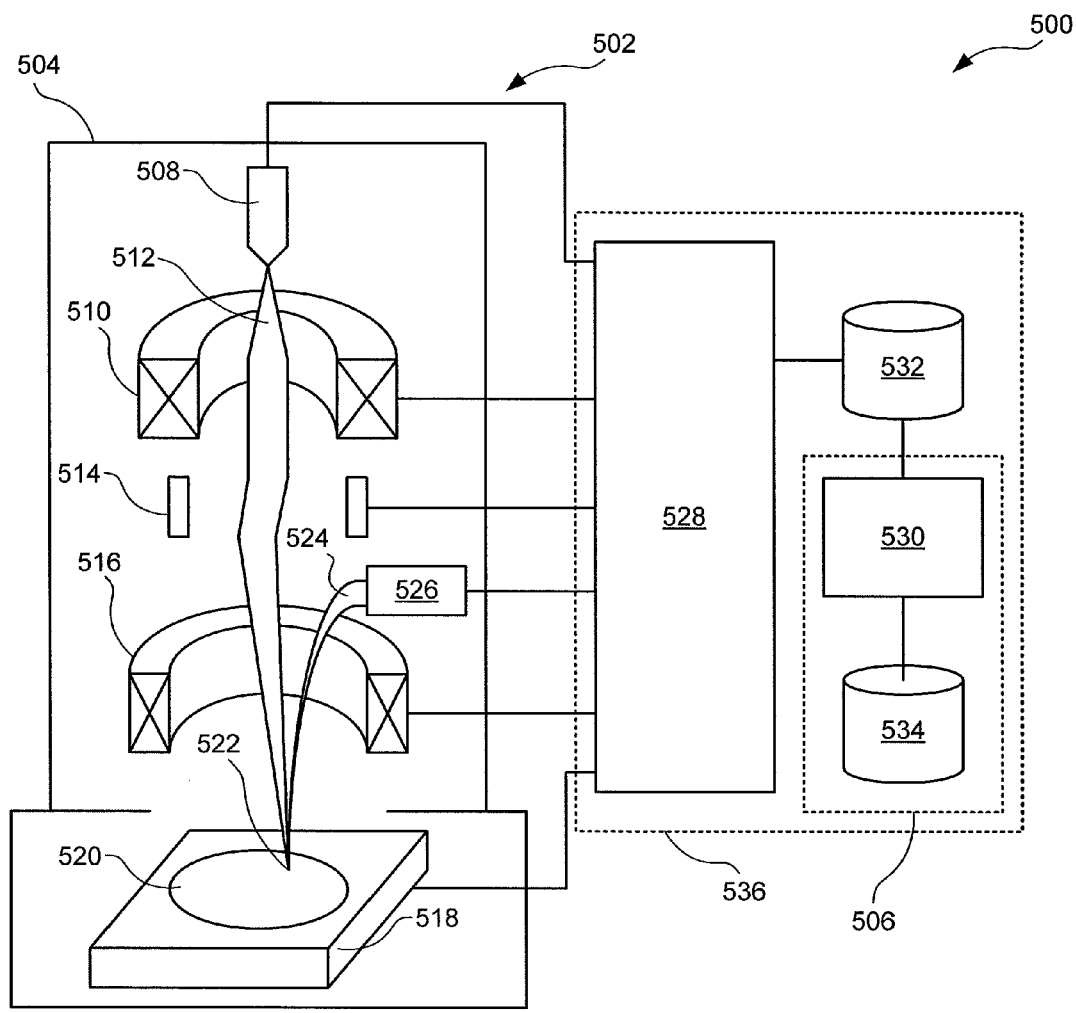
FIG. 5 is a schematic diagram of a measurement system for evaluating a pattern, according to one or more embodiments.

Embodiments will hereinafter be described in detail with reference to the accompanying drawings, wherein like reference numerals represent like elements. The accompanying drawings have not been drawn to scale. Any data presented in the accompanying graphs and figures is for illustration purposes only and may not represent actual data. Where applicable some features have not been illustrated to assist in the description of underlying features.

Edge roughness of a degraded hole pattern can cause an electric field concentration to occur at sharp tip projections, referred to herein as spokes, at an edge of the pattern. With reference to FIG. 1, contact holes formed from a hole pattern are represented by reference numerals 104, 106, and 108. For example, these contact holes are metal-filled holes that electrically connect components on different layers in a semiconductor device. An insulating material 102 spatially and electrically isolates the contact holes from each other. An edge defect from the patterning of contact hole 108 results in spoke 112, which projects toward contact hole 104. Since the region of insulator 102 between holes 104 and 108 has been effectively decreased by spoke 112, the insulator may be susceptible to electrical breakdown if a potential difference exists between contact holes 104 and 108. Moreover, the geometry of the spoke 112 may result in an electric field concentration that could also destroy insulator 102. Sharper spokes could result in a concentration of electric field at a tip thereof. Because the spoke 112 projects beyond a normative edge of the contact hole 108, it is termed herein a convex spoke.

In contrast, contact hole 106 has a spoke 110, which projects away from contact hole 104. Since the region of insulator 102 between holes 104 and 108 has been effectively increased by spoke 110, this type of defect may be less susceptible to electrical breakdown if a potential difference exists between contact holes 104 and 106. Because it projects toward the interior of the contact hole 106, such spokes 110 are termed herein concave spokes.

To evaluate CER of a hole or dot pattern, the pattern formed in/on the substrate is compared with an ideal shape, such as a designed shape or a fitted shape, to determine the variation of the edge from an ideal smooth contour. The standard deviation, σ, of the variations of the edge is used to characterize the edge roughness. The standard deviation provides a measure of the variability of the edge of the hole pattern. However, the standard deviation does not provide a measure of the sharpness of spokes, which plays a role in electric field concentration.

A self-correlation angle can be calculated from a local difference between the shape of a designed (or fitted) pattern and that of the formed pattern. This self-correlation angle is approximately equivalent to an angle 206 corresponding to the width of spoke 204 that exists at the edge of pattern 202, shown in FIG. 2. Small self-correlation angles may indicate that a sharp projection exists. As a result, the self-correlation angle may provide a measure of sharpness and the potential for electric field concentration. However, when the pattern 202 has a large size, even if the value of the angle 206 is small, the spoke at the edge may not be sharp and thus have a minimal influence on device performance.

For example, when a pattern is an elliptical pattern, as shown in FIGS. 3-4, the sharpness of the projections indicated by the same self-correlation angle 306 is different because of the spoke location along the pattern edge. A projection 310 near a center 314 of the elliptical pattern 312, shown in FIG. 4, is much sharper than a projection 304 far from a center 308 of the elliptical pattern 302, shown in FIG. 3. Therefore, an electric field concentration may be greater at spoke 310 closer to the center 314 of pattern 312 than at a spoke 304 far from the center 308 of pattern 302. Thus, the self-correlation angle alone may not be indicative of an electric field concentration caused by the CER.

Note that the performance of semiconductor devices may be sensitive to the sharpness of spokes in line patterns as well as hole patterns. As such, the self-correlation angle may provide a measure of the potential for electric field concentration due to edge roughness of line patterns as well. In view of the discussion above, the self-correlation angle of a spoke extending away from the interior of the pattern may be important in evaluating a pattern. However, while the self-correlation angle may provide an indication of sharpness, it does not always provide an accurate indication of the size or orientation of the spoke.

Accordingly, metrics are disclosed herein which take into account spoke and pattern features to appropriately characterize CER and the resulting effect on semiconductor device performance. Height and width indices may be determined for an imaged pattern. These indices provide a characterization of spoke geometry (e.g., size and sharpness) for the pattern. The height and width indices may be combined into a single roughness metric indicative of spoke severity. Alternatively, the height and width indices are used in the determination of potential electric field concentrations from the CER. A concavity parameter may be determined to determine the orientation of CER spokes, i.e., concave (projecting toward the interior of the pattern) or convex (projecting away from the interior of the pattern). Those patterns characterized as concave may be determined to have a minimal impact on device performance regardless of the size of the spokes, and thus may be ignored for the purposes of quality control measures.

FIG. 5 shows a measurement system 500 for evaluating the degradation of pattern features. The measurement system 500 includes a microscope for imaging minute features of a sample. For example, the microscope is a critical dimension scanning electron microscope (CD-SEM) 502. The CD-SEM 502 includes a microscope column 504 with a variety of components for electron beam generation and detection. An electron gun 508 produces an electron beam 512, the direction and width of which are controlled using a first electromagnetic lens 510, a second electromagnetic lens 516, and a deflector 514. The electron beam 512 irradiates a particular location 522 on a sample 520 with electrons thereby generating secondary electrons 524.

For example, targets 522 may be individual chips or patterns on a semiconductor wafer. The sample 520 is supported by a microscope stage 518, which manipulates the position of the sample 520 with respect to the electron beam 512. The secondary electrons 524 emanating from location 522 are detected by a secondary electron detector 526. The secondary electrons 524 are used to generate an image of the sample 520 at target 522.

The measurement system 500 also includes a control module 528. Control module 528 may be integrated with the CD-SEM 502 or be a stand alone component, such as a programmed computer or processor. The control module 528 is operatively connected to and controls the various components of the CD-SEM 502, including the electron gun 508, the electromagnetic lenses 501 and 516, the deflector 514, and the microscope stage 518 to image sample 520. The control module 528 receives secondary electron data from the secondary electron detector 526, which is then used to form an image. Image data is stored in memory 532.

The measurement system also includes a critical dimension (CD) evaluation module 506. The CD evaluation module 506 receives the image data from the memory 532. Alternatively, the CD evaluation module 506 receives the image data directly from the control module 528. The CD evaluation module 506 includes a failure analysis module 530 and a memory 534. Image data from memory 532 is analyzed by the failure analysis module 530 to determine, among other things, the fidelity of the patterns on the sample 520 and the likelihood for failure based on pattern geometry. The results of the analysis are stored in memory 534.

It is noted that the various components of the control module 528 and the CD evaluation module 506 need not be embodied as separate components. Rather, modules 528 and 506 may be embodied as a single computer or processor 536, or as separate modules operatively connected together, such as independent computers or processors connected together using data transmission or interfacing means. The modules 506 and 528 may also be combined with one or more other modules, for example, as part of quality control processors or controllers in a semiconductor manufacturing line. Likewise, the memory devices 532, 534 may also be combined into a single memory device or separated into multiple memory devices.

Moreover, one or more of the modules 506 and 528 may be integrated with the SEM 502. Although separate components are illustrated in FIG. 5 with associated functions discussed above, components may be added, omitted, or combined and/or functions may be added, omitted, or transferred amongst components without departing from the spirit and scope of the disclosed embodiments.

Figure 6:
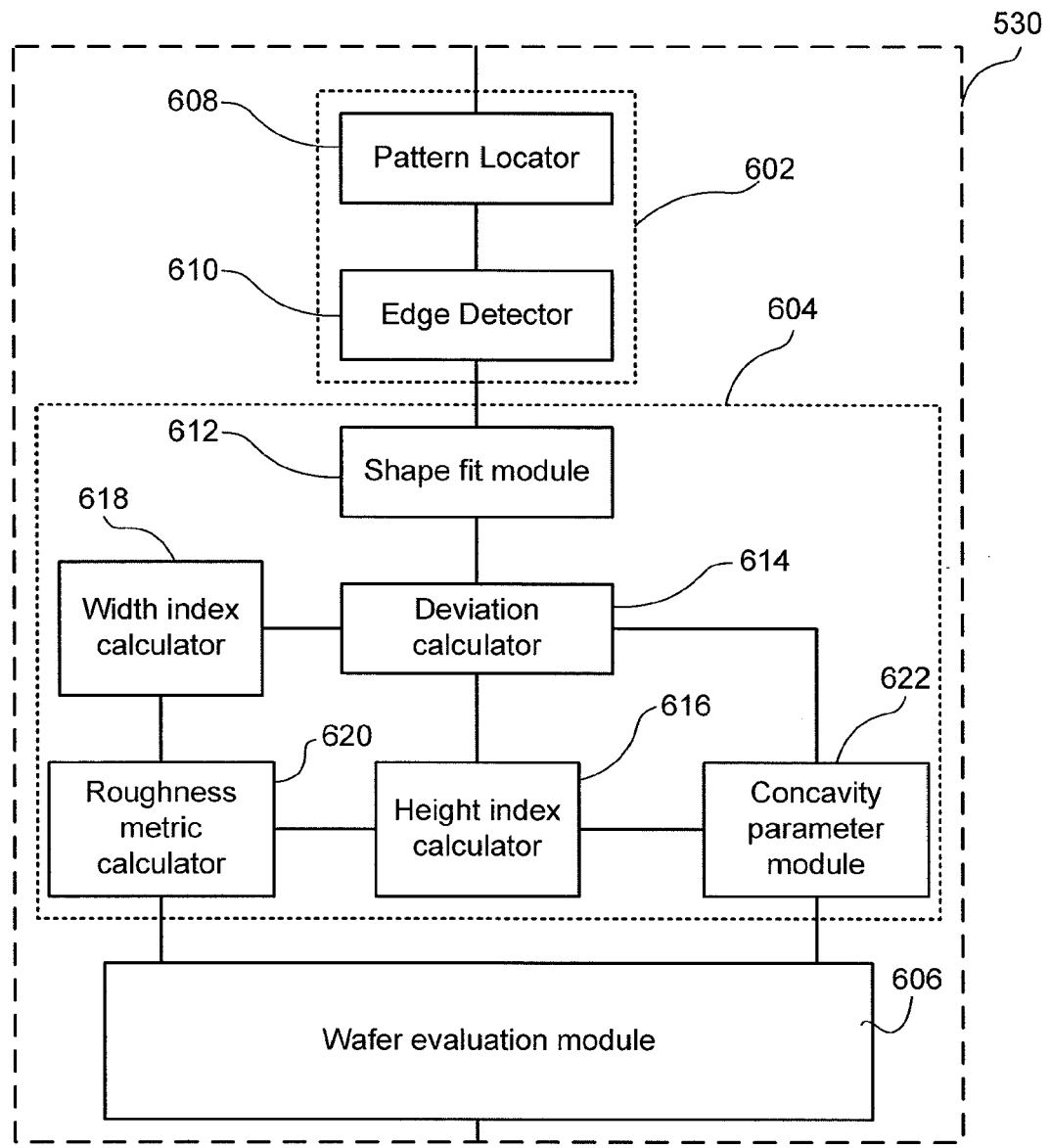
FIG. 6 is a schematic diagram of a failure analysis module for use in the measurement system of FIG. 5.

Referring to FIG. 6, failure analysis module 530 may include a variety of sub-modules, in particular, an image processing module 602, a pattern evaluation module 604, and a wafer evaluation module 606. Image processing module 602 receives images of the wafer and processes the images to locate the formed patterns on the wafer. The pattern evaluation module 604 receives the processed image from the image processing module 602, along with information regarding each pattern, and calculates a roughness metric and concavity parameter for each pattern therefrom. The wafer evaluation module 606 receives the roughness metric and concavity parameter for each pattern and calculates an index for the whole wafer based thereon.

Image processing module 602 includes a pattern locating module 608 and an edge detection module 610. The pattern locating module 608 is configured to find a particular pattern of interest, such as a contact hole, in an image of the sample. The pattern locating module 608 may identify the pattern using one or more of pattern recognition, user input, or predetermined pattern coordinates, such as coordinates on a photolithographic mask used to create the pattern. Edge detection module 610 receives the image from the pattern locating module 608 together with information regarding the location of the pattern. Using image processing techniques, the edge detection module locates the edges of the pattern. The locating includes extracting coordinates of a position of a plurality of points along the edge of the pattern.

The pattern evaluation module 604 includes a shape fitting module 612, a deviation calculation module 614, a height index module 616, a width index module 618, a roughness metric calculation module 620, and a concavity parameter module 622. The shape fitting module 612 receives one or more images of the pattern as well as information regarding the coordinates of points on the edge of the pattern from the image processing module 602. The shape fitting module 612 approximates the formed pattern using a closed two-dimensional shape, such as an ellipse or other geometric shape that is represented by an analytical function. The deviation calculator 614 calculates a difference between the closed two-dimensional shape and the formed pattern by comparing the coordinates of the points on the edge of the formed pattern with corresponding points on the edge of the closed shape.

The difference between the closed two-dimensional shape and the formed pattern is used by various modules in the pattern evaluation module 604 to characterizing the formed pattern. For example, the height index module 616 and the width index module 618 calculate height and width indices, respectively, for the formed pattern. The roughness metric calculation module 620 calculates height and width indices to determine a roughness metric for the formed pattern. Concavity parameter module 622 uses the difference between the ideal shape and the formed pattern (and/or the coordinates of points on the edge of the formed pattern) to determine the orientation of CER spokes for the formed pattern. This orientation may be embodied as a concavity parameter, such as a number or label (e.g., "convex" or "concave").

Wafer evaluation module 606 accumulates the roughness metrics and/or concavity parameters for all of the imaged patterns on the wafer to determine the quality of the patterns formed on the wafer. Wafer evaluation module may interact with a user or other components of a quality control process to provide an alert when a wafer does not meet certain threshold criteria. For example, the wafer evaluation module 606 may send a notice to a user via a display device or the like when a wafer index exceeds a predetermined threshold value.

Figure 7:
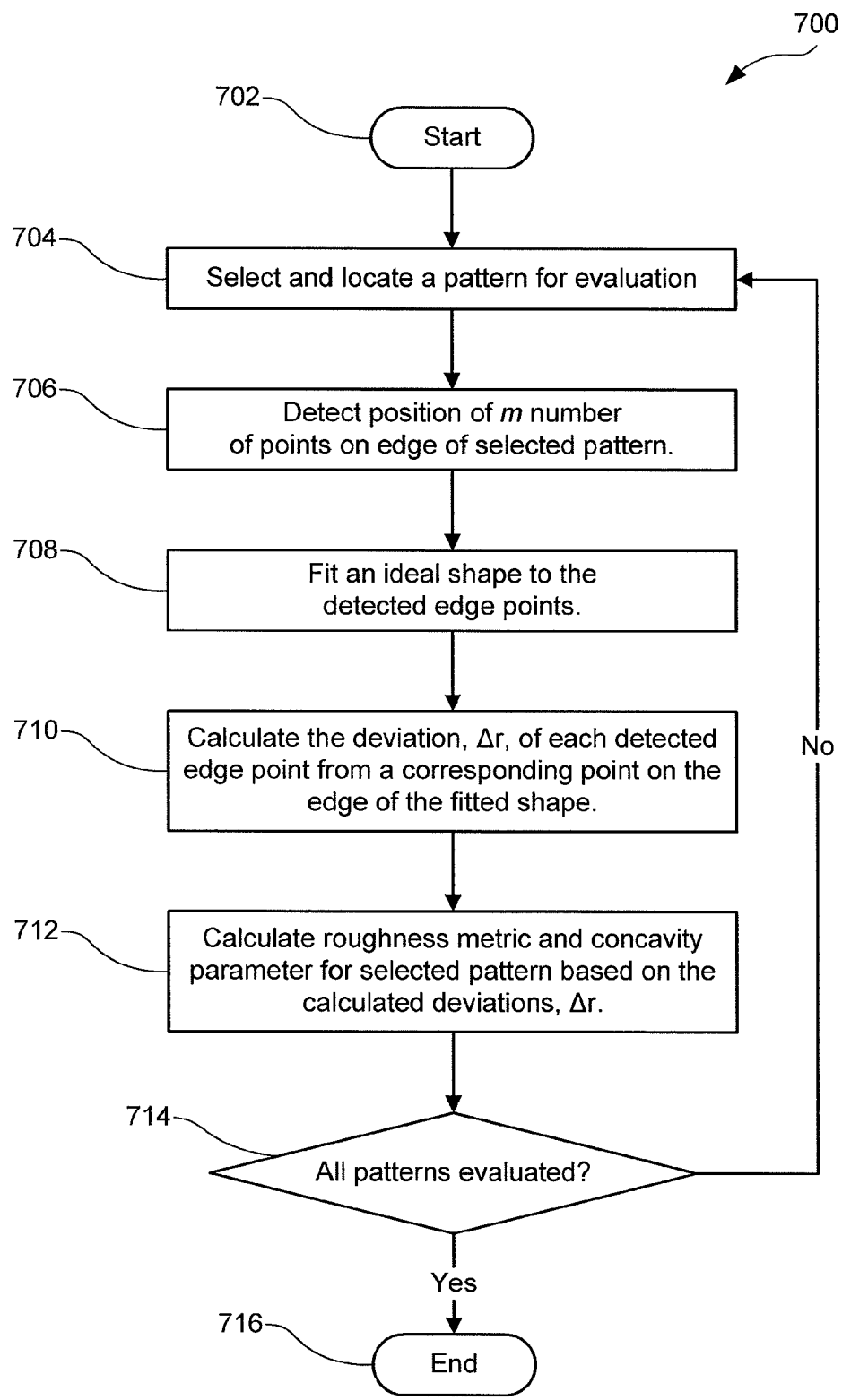
FIG. 7 is a process flow diagram illustrating steps for evaluating the patterns in an image of the patterns, according to one or more embodiments.

Referring now to FIG. 7, an exemplary process 700 for execution by the failure analysis module 530 is shown. The process starts at 702 and proceeds to step 704. In step 704, an image of a wafer is processed for a specific pattern. A user may select one of the patterns in the image, or the module 530 may select a pattern for analysis based on a predetermined routine or map associated with the CD evaluation process. For example, coordinate locations for patterns of interest may be stored in module 530 and used to select individual patterns for analysis. Alternatively, the pattern may be located using pattern recognition to identify a pattern of interest.

At step 706, the module may detect the edge of the selected pattern. In particular, coordinates of a plurality of points (for example, an 'm' number of points) on the edge of the formed pattern are determined. The points may be equally spaced on the circumference of the formed pattern. The spacing may be chosen so as to provide sufficient discrimination based on the anticipated CER and size of the imaged pattern.

At step 708, the module fits an ideal shape, such as a closed two-dimensional shape, to the detected edge points. For example, a plurality of points on the edge of a formed pattern 804 may be determined, as shown in FIG. 8A. Standard fitting algorithms may determine a closed-form shape, such as ellipse 800, which approximates the formed pattern 804, based on the detected edge points. Alternatively, a closed-form shape based on the pattern as designed may be used. Each point on the fitted shape 800 is characterized by a distance, $r_i$, from center 802. Each point on the edge of the formed pattern 804 is characterized by a distance, $r_o$, from center 802.

A variety of different shapes and functions may be used to approximate the formed patterns. When the pattern has been designed as a perfect circle, the fitted shape is given by the function:

$$(X-X_c)^2+(Y-Y_c)^2=R^2, \qquad (1)$$

where $X_c$ and $Y_c$ are the coordinates of the center of the circle and R is the radius of the circle.

When the formed pattern is designed as an ellipse, an elliptical function is used to approximate the formed pattern. An ellipse, as shown in FIG. 8B, is given by equation (2) below:

$$\left[\frac{(X-X_c)\cos\theta+(Y-Y_c)\sin\theta}{a}\right]^2+\left[\frac{-(X-X_c)\sin\theta+(Y-Y_c)\cos\theta}{b}\right]^2=1 \qquad (2)$$

where $X_c$ and $Y_c$ are the coordinates of the center 802 of the ellipse 800, a is the half-width of the ellipse along the minor axis 818, b is the half-width of the ellipse along the major axis 816, and θ is the angle 814 of the minor axis 818 with respect to the x-axis.

Various combinations of shapes can be used to approximate a formed pattern where a single closed form shape may not be sufficient. For example, when the designed pattern is an ellipse and the ratio of the long radius to the short radius is greater than 3, the elliptical function given by equation (2) may not adequately approximate the formed pattern. Accordingly, the shape shown in FIG. 8C may be used. The shape consists of two half circles and a rectangle. For example, the shape 800' shown in FIG. 8C is represented by equations (3)-(5) below:

$$\begin{pmatrix}X\\Y\end{pmatrix}=\begin{pmatrix}\cos\theta & -\sin\theta\\ \sin\theta & \cos\theta\end{pmatrix}\begin{pmatrix}x-X_c\\y-Y_c\end{pmatrix}+\begin{pmatrix}X_c\\Y_c\end{pmatrix} \qquad (3)$$

$$x-X_c=\pm a \text{ for } (|y-Y_c|\le b) \qquad (4)$$

$$x-X_c=\pm\sqrt{a^2-(y-Y_c-b)^2} \text{ for } (|y-Y_c|>b) \qquad (5)$$

where $X_c$ and $Y_c$ are the coordinates of the center 802' of the shape 800', a is the half-width of the shape along the minor axis 818', b is the length of the shape along the major axis 816' between the center 802' and the curved end portion, and θ is the angle 822 of the minor axis 818' with respect to the x-axis.

Figure 9:
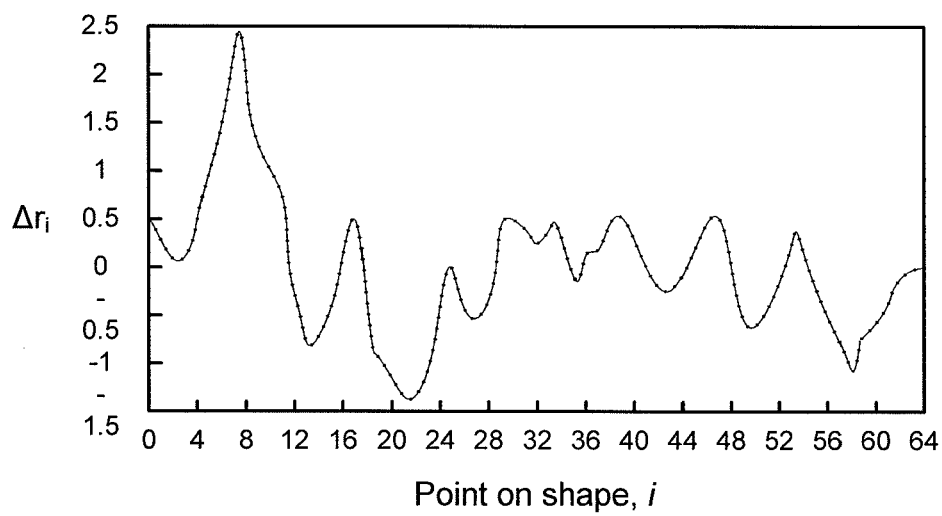
FIG. 9 is a graph of exemplary edge deviations of an elliptical hole pattern from an ideal hole pattern.

Referring again to FIG. 7, the process 700 proceeds to step 710. In step 710, the module 530 calculates a deviation between the formed pattern and the fitted shape. This deviation is determined, for example, as the difference between corresponding points on the edge of the formed pattern and on the edge of the fitted shape. Corresponding points on the fitted shape and the formed pattern can be determined using a radially extending line from a center of the fitted shape, although other methods for determining correspondence are also possible. For example, with reference to FIG. 8A, the module 530 determines a deviation for each point on the formed pattern 804 as the difference in the radial distance from center 802 of corresponding points on the formed pattern 804 and the fitted shape 800. Thus, for each point, i, on the fitted shape 800 a deviation, $\Delta r_i$, is determined as:

$$\Delta r_i = r_o - r_i, \quad (6)$$

where $r_i$ is the distance from center 802 to the point i on the fitted shape 800 and $r_o$ is the distance from the center 802 along the same radial line as $r_i$ to the formed pattern 804. Alternatively, $\Delta r_i$ may be characterized as the distance from a point i on the fitted shape 800 and a corresponding point on the formed pattern 804 with the corresponding point lying along a line perpendicular to the circumference of the fitted shape 800 at the point i. In either case, when the formed pattern extends beyond the fitted shape, the deviation 806 is positive. When the formed pattern is within the bounds of the fitted shape, the deviation 808 is negative. The graph in FIG. 9 shows an exemplary plot of the deviations of a formed pattern from a fitted shape.

Figure 10:
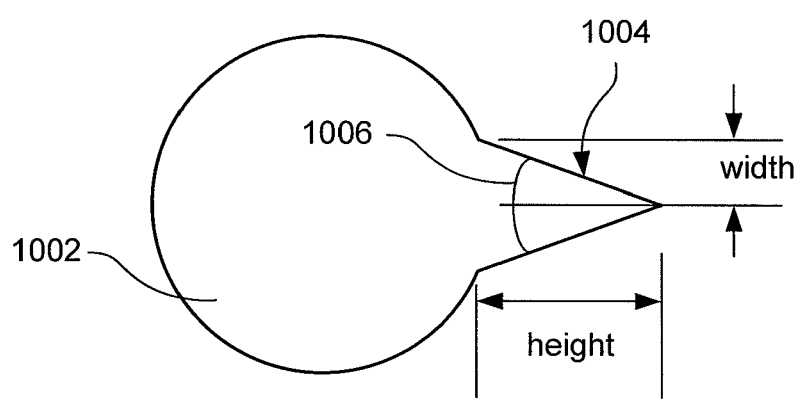
FIG. 10 is a diagram showing a close-up view of a single circular hole pattern with a single spoke.

In addition to the deviation from the ideal shape (e.g., spoke height), the relationship of a particular point to the surrounding points on the edge of the formed pattern is also indicative of spoke geometry. Spoke width provides a measure of the circumferential extent of spoke 1004, and thus the relationship between adjacent points on the edge of the formed pattern. With reference to FIG. 10, the height and width of spoke 1004 are correlated to each other through spoke angle 1006, as spoke angle 1006 is proportional to the inverse tangent of the height divided by the width. Thus, by determining indicators of the height and width, a more accurate measure of spoke sharpness and its relative impact on device performance are obtained. To this end, height and width indices, representative of spoke height and spoke width, respectively, are used.

Referring again to FIG. 7, the process 700 proceeds to step 712. In step 712, the module calculates a roughness metric and a concavity parameter for the formed pattern based on the calculated deviations for each point on the formed pattern edge.

The process repeats for each relevant pattern that is to be evaluated. The number of relevant patterns is a sampling of the total patterns on the wafer or of the total patterns in a chip on the wafer. Alternatively, the number of relevant patterns includes all patterns in a chip or subset of chips on the wafer. In yet another alternative, the number of relevant patterns includes all the patterns on the wafer. In still another alternative, all or a portion of the patterns on the wafer that are particularly susceptible to failure, either because of function or size, are evaluated. In step 714, it is determined if all relevant patterns have been evaluated. The process 700 repeats steps 704 through 714 until all relevant patterns have been evaluated, at which point the process terminates at 716.

Figure 12:
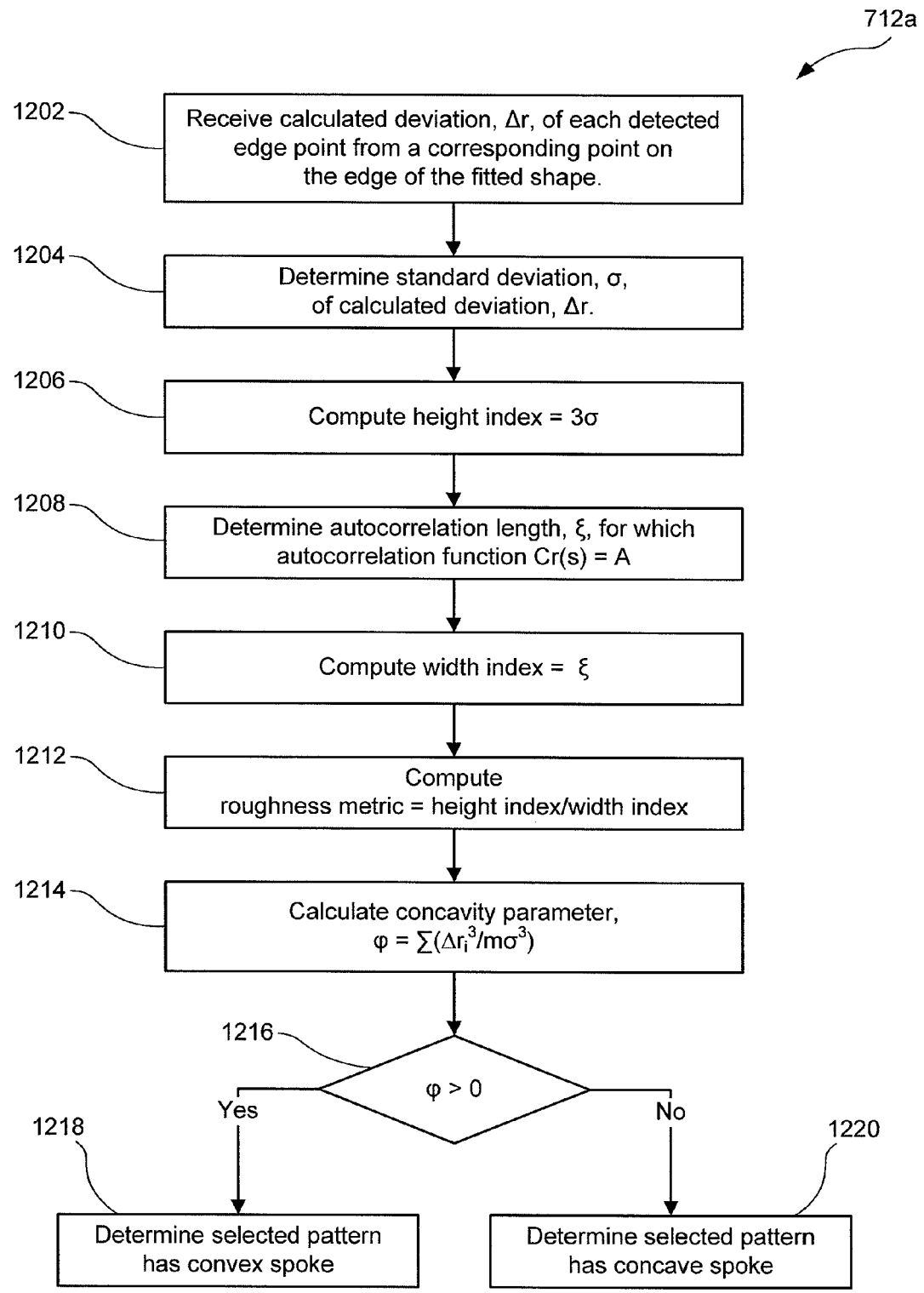
FIG. 12 is a process flow diagram illustrating steps of a first process for calculating a roughness metric and a concavity parameter for a particular hole pattern.

According to a first embodiment 712a shown in FIG. 12, the deviations, $\Delta r_i$, of each edge point of the formed pattern from the corresponding edge point of the fitted shape are received in step 1202. For example, height and width index calculators 616, 618 receive this information from deviation calculator 614 in FIG. 6.

The height index is determined as a multiple of the standard deviation of the deviation distribution. For example, the height index is given by:

$$3\sigma = 3 \cdot \sqrt{\sum_{i=1}^{m} \frac{\Delta r_i^2}{m(m-1)}}, \quad (7)$$

where $\sigma$ is the standard deviation, m is the number of points on the edge of the formed pattern, and $\Delta r_i$ is the deviation of the point i on the edge of the formed pattern from the ideal shape. If the deviation distribution is a normal distribution, $3\sigma$ is sensitive to large $\Delta r_i$ while being stable against measurement error. Thus, in step 1204, the standard deviation, $\sigma$, is determined followed by the determination of the height index in step 1206.

The width index is determined using an autocorrelation function of the deviation in the height (or radial) direction from the edge of the fitted shape along the circumference thereof. In particular, the width index is equal to the auto-correlation length, $\xi$, as given by equations (8)-(10) below. The auto-correlation function is given by:

$$Cr(s) = \frac{1}{\sigma^2} \sum_{i=1}^{m} \Delta r_i \Delta r_{i+j}, \quad s = j \cdot \Delta s, \quad (8)$$

where s is a shift between the original deviations, $\Delta r_i$, and the shifted deviations, $\Delta r_{i+j}$, j is the number of data points of the shift s, and $\Delta s$ is the average distance between adjacent data points (e.g., $P_i$ and $P_{i+1}$) and is given by:

$$\Delta s = \overline{P_i P_{i+1}} \text{ for } \forall i. \quad (9)$$

The auto-correlation length, $\xi$, is the value of s for which:

$$Cr(\xi) = A_o. \quad (10)$$

where $A_o$ is a predetermined constant.

Figure 11:
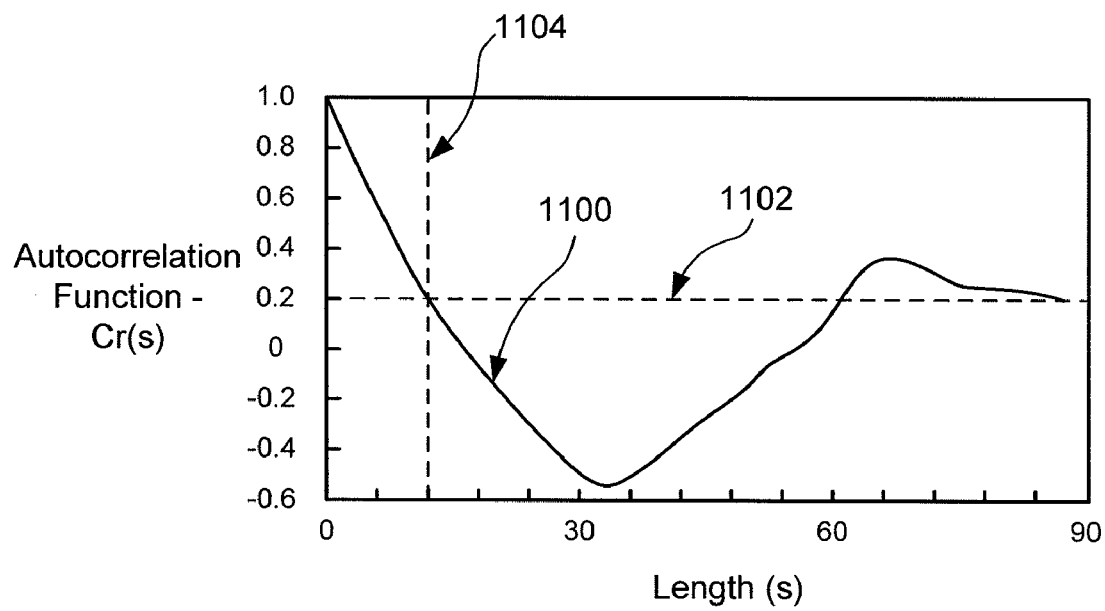
FIG. 11 is a graph of an autocorrelation function for an exemplary hole pattern.

For patterns formed in photo-resist, an $A_o$ of 0.2 is appropriate. However, other values for determining the auto-correlation are also possible depending on, for example, the pattern material and shape, device layout, and/or quality control standards. An example of a plot 1100 of an auto-correlation function is shown in FIG. 11. The intersection of the predetermined value 1102 with the plotted auto-correlation function 1100 determines the auto-correlation length 1104. Thus, in step 1208, the auto-correlation function is evaluated to determine the value for the length which yields the desired constant, $A_O$. The resulting length, $\xi$, is selected as the width index in step 1210.

The roughness index is computed in step 1212 as the ratio of the height index to the width index. As is evident, larger values for the height index indicate that a spoke extends farther from the ideal shape while smaller values of the width index indicate that a spoke is narrower. Thus, larger values of the roughness index represent spokes which are relatively large and/or sharp.

The process proceeds to step 1214 wherein a concavity parameter, $\phi$, is determined. The concavity parameter, $\phi$, is used to determine if the spoke or spokes along the edge of a formed pattern are concave or convex. As discussed above, convex spokes are of particular interest whereas concave spokes may not negatively affect device performance.

When using $3\sigma$ as the height index, the concavity parameter is determined from the skewness of the deviation distribution. Thus, the concavity parameter, $\phi$, is calculated in step 1214 according to:

$$\varphi = \sum_{i=1}^{m} \frac{(\Delta r_i)^3}{m\sigma^3}. \quad (11)$$

In step 1216, the value of the concavity parameter, $\phi$, is evaluated. If the concavity parameter is greater than zero (i.e., skewness>0), this indicates that the pattern has convex spokes. The process advances to step 1218 wherein the pattern is labeled as convex. If the concavity parameter is less than or equal to zero (i.e., skewness≦0), this indicates that the pattern has concave or no spokes. The process advances to step 1220 wherein the pattern is labeled as concave.

Figure 13:
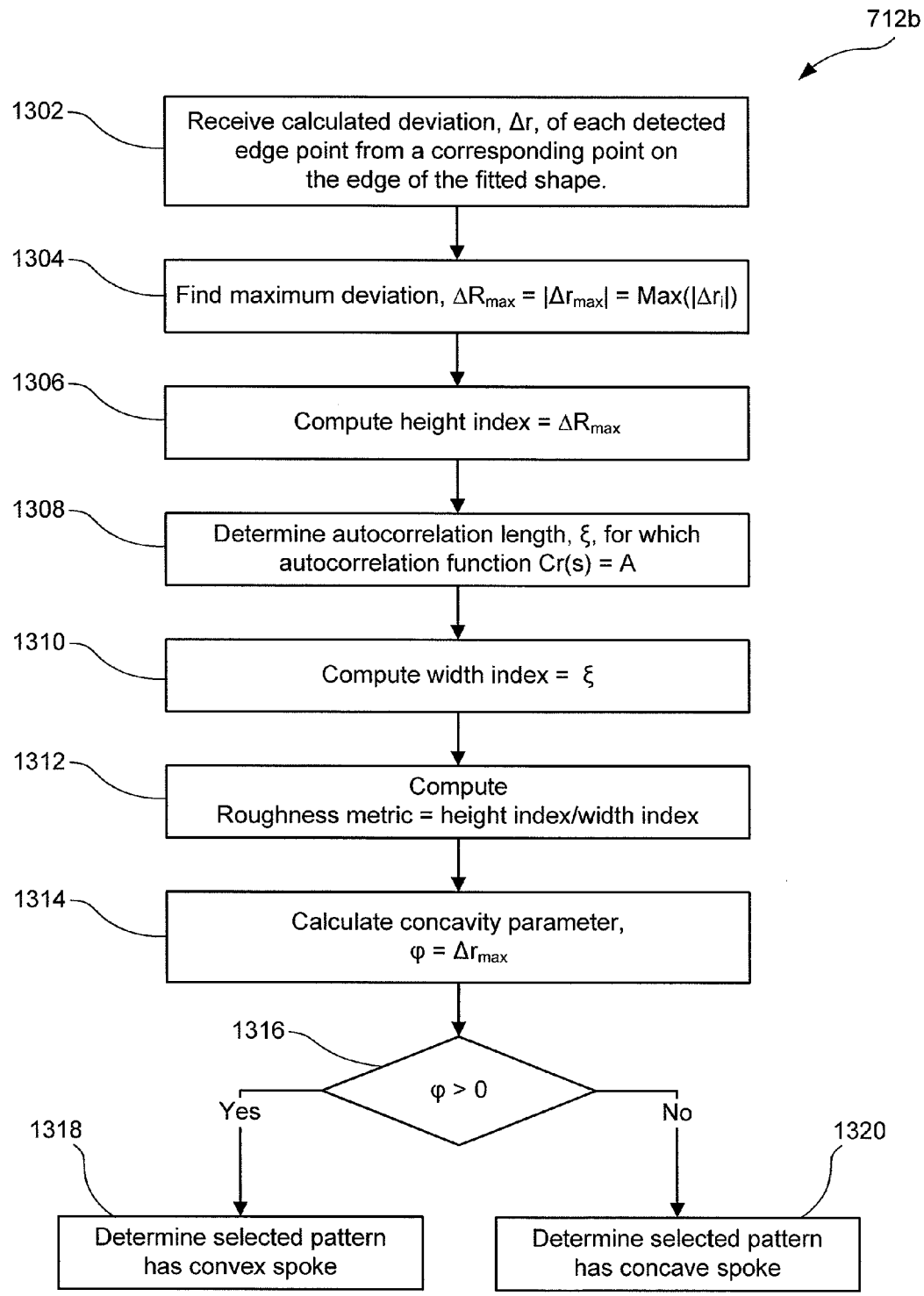
FIG. 13 is a process flow diagram illustrating steps of a second process for calculating a roughness metric and a concavity parameter for a particular hole pattern.

According to a second embodiment 712b, shown in FIG. 13, the deviations, $\Delta r_i$, of each edge point of the formed pattern from the corresponding edge point of the fitted shape are received in step 1302. For example, height and width index calculators 616, 618 receive this information from deviation calculator 614 in FIG. 6.

The height index is determined as the maximum absolute value from the deviation distribution. For example, the height index is $\Delta R_{max}$, where $\Delta R_{max}$ is given by:

$$\Delta R_{max} = |\Delta r_{max}| = \text{MAX}(|\Delta r_i|), \quad (12)$$

where $\Delta r_i$ is the deviation of the point i on the edge of the formed pattern from the ideal shape, and $\Delta r_{max}$ is the deviation having the largest absolute value. Thus, in step 1304, the maximum deviation, $\Delta R_{max}$, is determined followed by the determination of the height index in step 1306.

While $\Delta R_{max}$ is sensitive enough to find the largest deviation that can contribute to the sharpest spoke, it should be noted that the largest deviation may also be due to measurement error. For example, variations in the edge of patterns observed by the CD-SEM may be due to local imaging fluctuations from electron beam charge build up.

As with the first embodiment, the auto-correlation function is evaluated to determine the value for the length which yields the desired constant, $A_O$, in step 1308 (see equations (8)-(10) above). The resulting length, $\xi$, is selected as the width index in step 1310. The roughness index is computed in step 1312 as the ratio of the height index to the width index. As is evident, larger values for the height index indicate that a spoke extends farther from the ideal shape while smaller values of the width index indicate that a spoke is narrower. Thus, larger values of the roughness index represent spokes which are relatively large and/or sharp.

The process proceeds to step 1314 wherein the concavity parameter, $\phi$, is determined. When using $\Delta R_{max}$ as the height index, the concavity parameter is determined based on the sign of the $\Delta r_{max}$ which yields $\Delta R_{max}$. Thus, the concavity parameter, $\phi$, is calculated in step 1314 according to:

$$\phi = \Delta r_{max}. \quad (13)$$

In step 1316, the value of the concavity parameter, $\phi$, is evaluated. If the concavity parameter is greater than zero (i.e., $\phi > 0$), this indicates that the pattern has convex spokes. The process advances to step 1318 wherein the pattern is labeled as convex. If the concavity parameter is less than or equal to zero (i.e., $\phi \leq 0$), this indicates that the pattern has concave or no spokes. The process advances to step 1320 wherein the pattern is labeled as concave.

Figure 14:
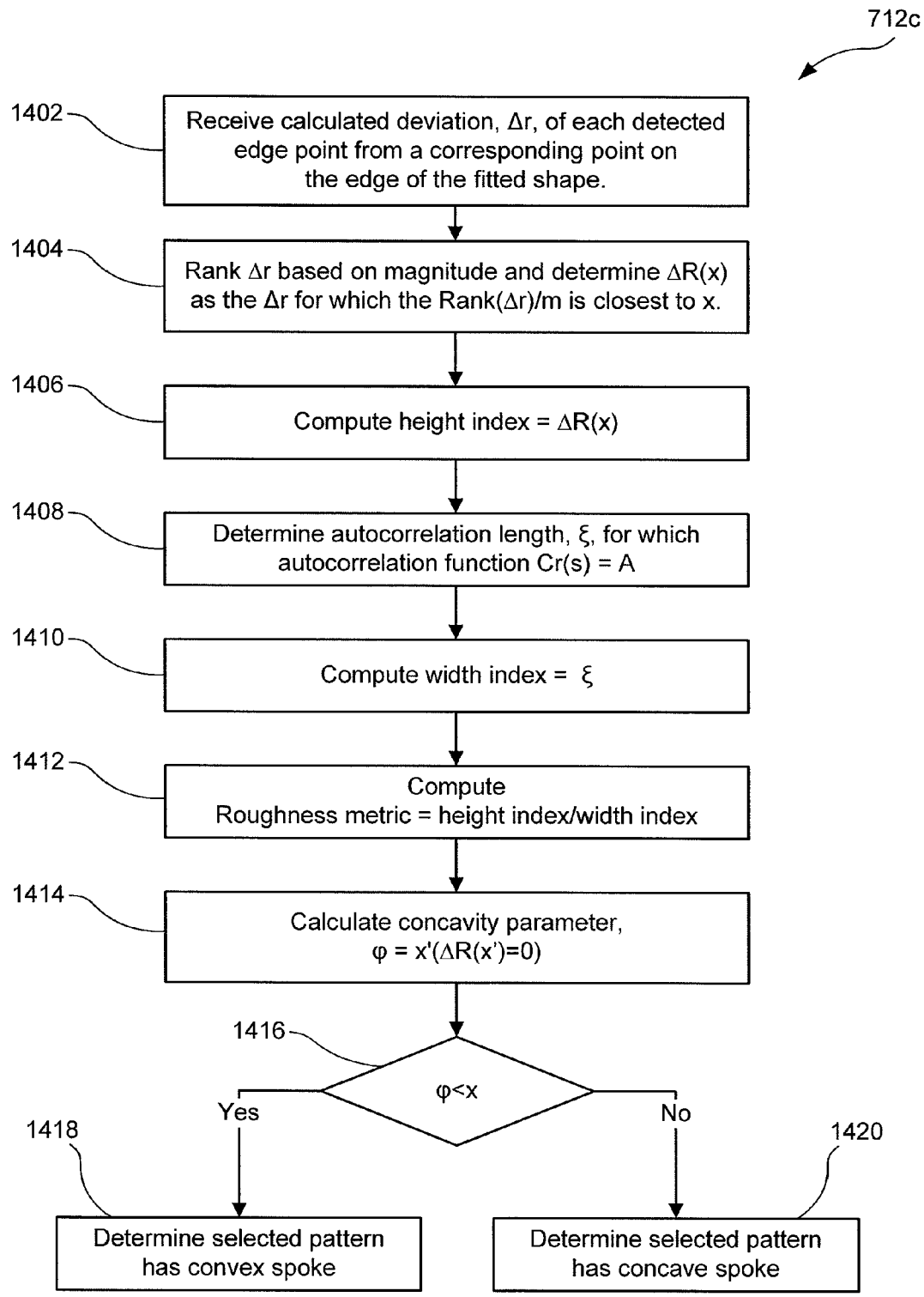
FIG. 14 is a process flow diagram illustrating steps of a third process for calculating a roughness metric and a concavity parameter for a particular hole pattern.

According to a third embodiment 712c, shown in FIG. 14, the deviations, $\Delta r_i$, of each edge point of the formed pattern from the corresponding edge point of the fitted shape are received in step 1402. For example, height and width index calculators 616, 618 receive this information from deviation calculator 614 in FIG. 6.

The deviations, $\Delta r_i$, are ranked according to magnitude. $\Delta R(x)$ represents one of the values in the ranking of deviations at a normalized index of x. In particular, the index x represents a ranking (e.g., Rank($\Delta r_i$)) of one of the measured deviations, $\Delta r_i$, based on its magnitude with respect to the other measured deviations. The index x is normalized with respect to the total number of edge points, m. Thus, x can range from a minimum value of 1/m to a maximum of 1. When x is equal to 1, the value of $\Delta R(1)$ is equal to the deviation having the largest value of the measured deviations. When x is equal to 1/m, the value of $\Delta R(1/m)$ is equal to the deviation having the smallest (e.g., most negative) value of the measured deviations.

In this embodiment, the height index is determined as the $\Delta R(x)$ for a predetermined index of x. For example, the height index is given by:

$$\Delta R(x) = \Delta r_i \text{ where } \frac{\text{Rank}(\Delta r_i)}{m} = x. \quad (14)$$

The predetermined value of x may be selected based on experiential data and/or numerical simulation. For example, an appropriate value for x may be within a range from 0.7 to 0.9, such as 0.8. Note that in some cases, there may be no Rank($\Delta r_i$)/m which is exactly equal to x. In such cases, the $\Delta r_i$ that yields a Rank($\Delta r_i$)/m closest to the predetermined index, x, may be used.

Thus, in step 1404, the deviations are ranked according to magnitude, and $\Delta R(x)$ is determined based on the predetermined x index value and the ranking. Following step 1404, the height index is set as $\Delta R(x)$ in step 1406.

Using the standard deviation as the height index for non-normal distributions may not indicate large deviations precisely. Thus, the use of $\Delta R(x)$ is particularly helpful when the deviation distribution is not a normal distribution. In addition, the robustness against measurement error increases with decreasing x from 1 in the case of $\Delta R(x)$.

As with the first embodiment, the auto-correlation function is evaluated to determine the value for the length which yields the desired constant, $A_O$, in step 1408 (see equations (8)-(10) above). The resulting length, $\xi$, is selected as the width index in step 1410. The roughness index is computed in step 1412 as the ratio of the height index to the width index. As is evident, larger values for the height index indicate that a spoke extends farther from the ideal shape while smaller values of the width index indicate that a spoke is narrower. Thus, larger values of the roughness index represent spokes which are relatively large and/or sharp.

The process proceeds to step 1414 wherein the concavity parameter, $\phi$, is determined. When using $\Delta R(x)$ as the height index, the concavity parameter is determined based on a normalized index, for which, $\Delta R(x) = 0$. That is, a normalized ranking is determined for the measured deviation, $\Delta r_i$, which is equal to zero. Note that in some cases, there may be no measured deviation which is exactly equal to zero. In such cases, the measured deviation which is closest to zero may be used. Thus, the concavity parameter, $\phi$, is calculated in step 1414 according to:

$$\phi = x'(\Delta R(x') = 0). \quad (15)$$

In step 1416, the value of the concavity parameter, $\phi$, is evaluated and compared to the predetermined ranking index, x, used in the determination of the height index (e.g., $\Delta R(x)$). If the concavity parameter is less than x (i.e., $\phi < x$), this indicates that the pattern has convex spokes. The process advances to step 1418 wherein the pattern is labeled as convex. If the concavity parameter is greater than or equal to x (i.e., $\phi \geq x$), this indicates that the pattern has concave or no spokes. The process advances to step 1420 wherein the pattern is labeled as concave.

Figure 15:
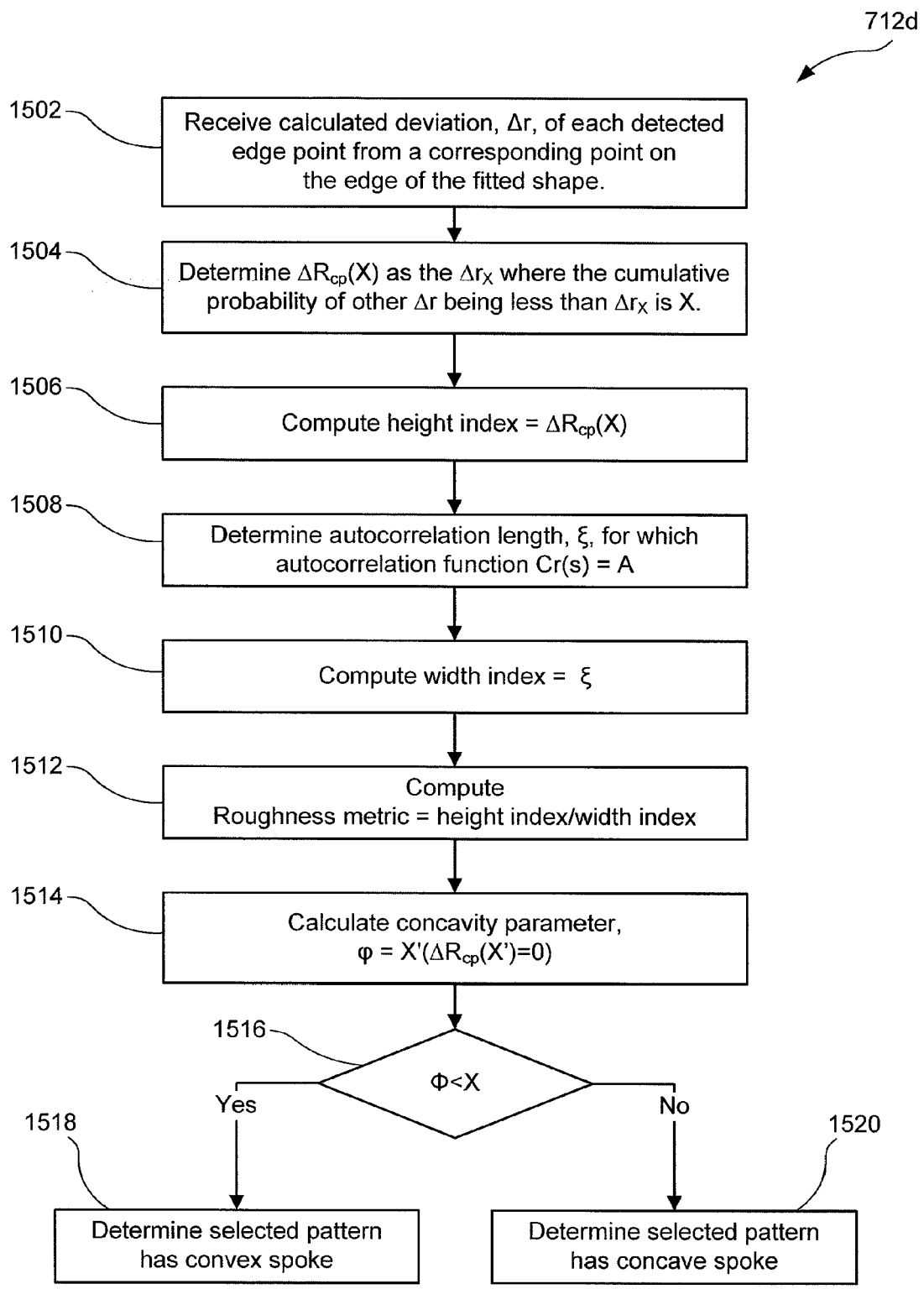
FIG. 15 is a process flow diagram illustrating steps of a fourth process for calculating a roughness metric and a concavity parameter for a particular hole pattern.

According to a fourth embodiment 712d, shown in FIG. 15, the deviations, $\Delta r_i$, of each edge point of the formed pattern from the corresponding edge point of the fitted shape are received in step 1502. For example, height and width index calculators 616, 618 receive this information from deviation calculator 614 in FIG. 6.

The height index is based on cumulative-probability-based deviation, $\Delta R_{cp}(X)$, which is one of the values of the measured deviations, $\Delta r_i$, for which X percentage of the measured deviations have magnitudes at or below said value. X thus represents the percentage (or cumulative probability) of measured deviations having a magnitude at or below a certain value. When X is equal to 100, all values of the measured deviations are equal to or less than the value of $\Delta R_{cp}(X)$. When X is equal to 0, all values of the measured deviations are greater than the value of $\Delta R_{cp}(X)$.

Figure 16:
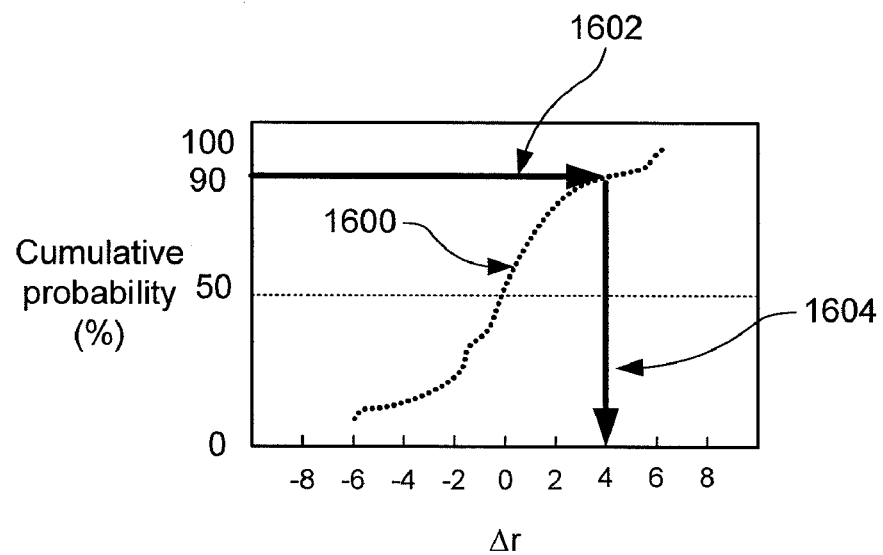
FIG. 16 is a cumulative probability graph of deviations of an exemplary hole pattern from an ideal shape.

In this embodiment, the height index is determined as the $\Delta R_{cp}(X)$ for a predetermined value of X. The predetermined value of X may be selected based on experiential data and/or numerical simulations. For example, an appropriate value for X may be within a range of 70% to 90%, such as 90%. In this example, $\Delta R_{cp}(90)$ would represent a selected deviation, $\Delta r_i$, at which 90% of the measured deviations have a magnitude equal to or less than the magnitude of the selected deviation, $\Delta r_i$. FIG. 16 shows an example of a cumulative probability plot. The deviations 1600 for the patterned shape extend from around −6 nm to around 7 nm. A cumulative probability of 90%, indicated by arrow 1602, signifies that 90% of the measured deviations are less than a deviation of 4 nm, indicated by arrow 1604. Thus, in step 1504, the $\Delta R_{cp}(X)$ is determined followed by the determination of the height index in step 1506.

When the distribution of the deviations for a pattern is not a normal distribution, the standard deviation may not precisely indicate large deviations. Employing $\Delta R_{cp}(X)$ for the height index is useful in such situations. In addition, the robustness against measurement error increases with decreasing X from 100% for $\Delta R_{cp}(X)$.

As with the first embodiment, the auto-correlation function is evaluated to determine the value for the length which yields the desired constant, $A_O$, in step 1508 (see equations (8)-(10) above). The resulting length, $\xi$, is selected as the width index in step 1510. The roughness index is computed in step 1512 as the ratio of the height index to the width index. As is evident, larger values for the height index indicate that a spoke extends farther from the ideal shape while smaller values of the width index indicate that a spoke is narrower. Thus, larger values of the roughness index represent spokes which are relatively large and/or sharp.

The process proceeds to step 1514 wherein the concavity parameter, $\phi$, is determined. When using $\Delta R_{cp}(X)$ as the height index, the concavity parameter is determined based on the cumulative probability (e.g., the value of X') for which the measured deviation is equal to or closest to zero (e.g., $\Delta R_{cp}(X')=0$). Thus, the concavity parameter, $\phi$, is calculated in step 1514 according to:

$$\phi = X'(\Delta R_{cp}(X')=0). \quad (16)$$

In step 1516, the value of the concavity parameter, $\phi$, is evaluated and compared with the predetermined value of X used in the determination of the height index. If the concavity parameter is less than X (i.e., $\phi<X$), this indicates that the pattern has convex spokes. The process advances to step 1518 wherein the pattern is labeled as convex. If the concavity parameter is greater than or equal to X (i.e., $\phi \geq X$), this indicates that the pattern has concave or no spokes. The process advances to step 1520 wherein the pattern is labeled as concave.

Figure 17:
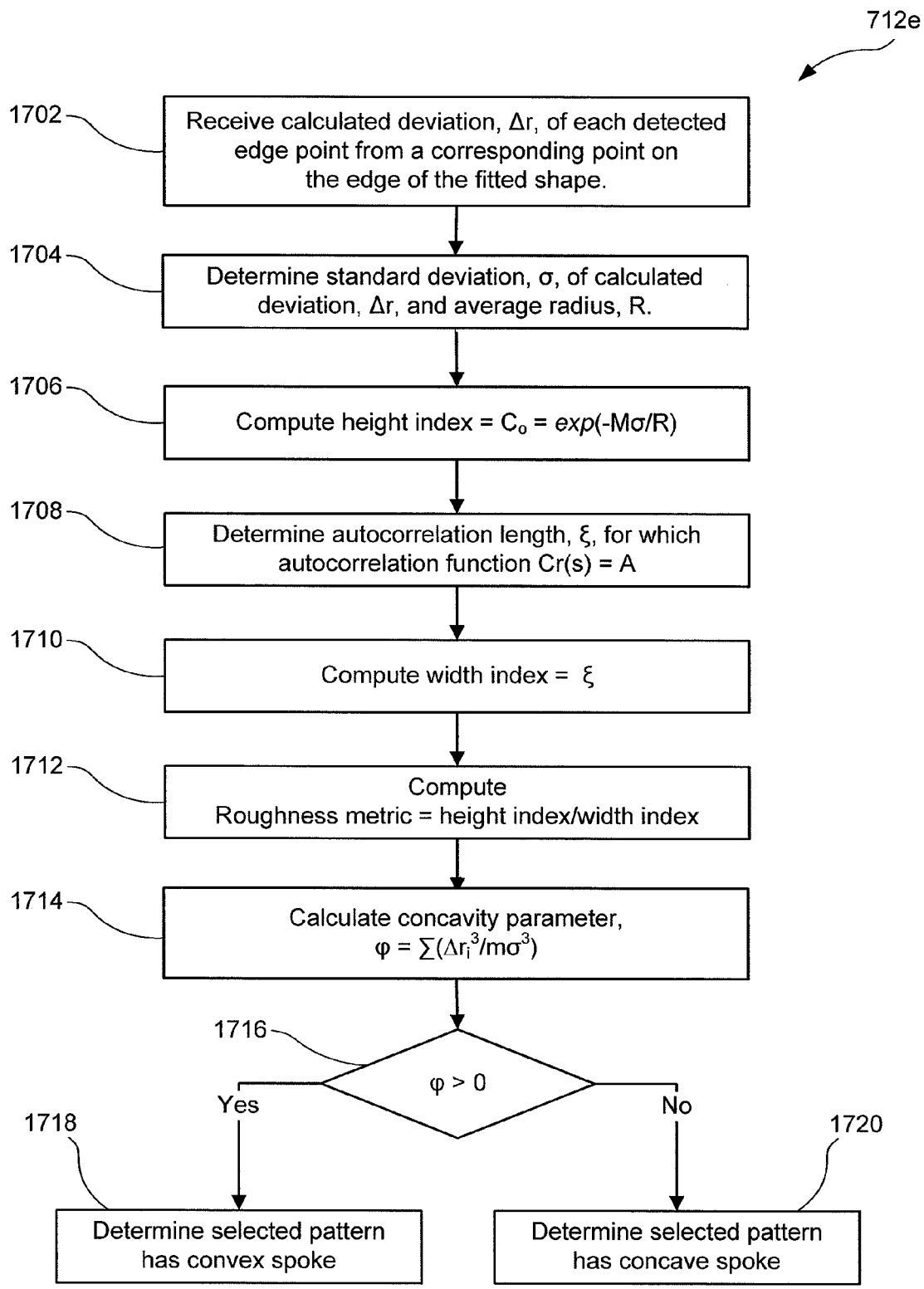
FIG. 17 is a process flow diagram illustrating steps of a fifth process for calculating a roughness metric and a concavity parameter for a particular hole pattern.

According to a fifth embodiment 712e, shown in FIG. 17, the deviations, $\Delta r_i$, of each edge point of the formed pattern from the corresponding edge point of the fitted shape are received in step 1702. For example, height and width index calculators 616, 618 receive this information from deviation calculator 614 in FIG. 6.

The height index is determined based on the standard deviation and pattern size. In particular, the height index is given by:

$$C_0 = \exp\left(\frac{-M\sigma}{R}\right), \quad (17)$$

where $C_o$ is the normalized variance, $\tau$ is the standard deviation, R is the average radius of the fitted shape, and M is a predetermined constant. Thus, in step 1704, the normalized variance, $C_O$, is determined, followed by the determination of the height index in step 1706.

Figure 18:
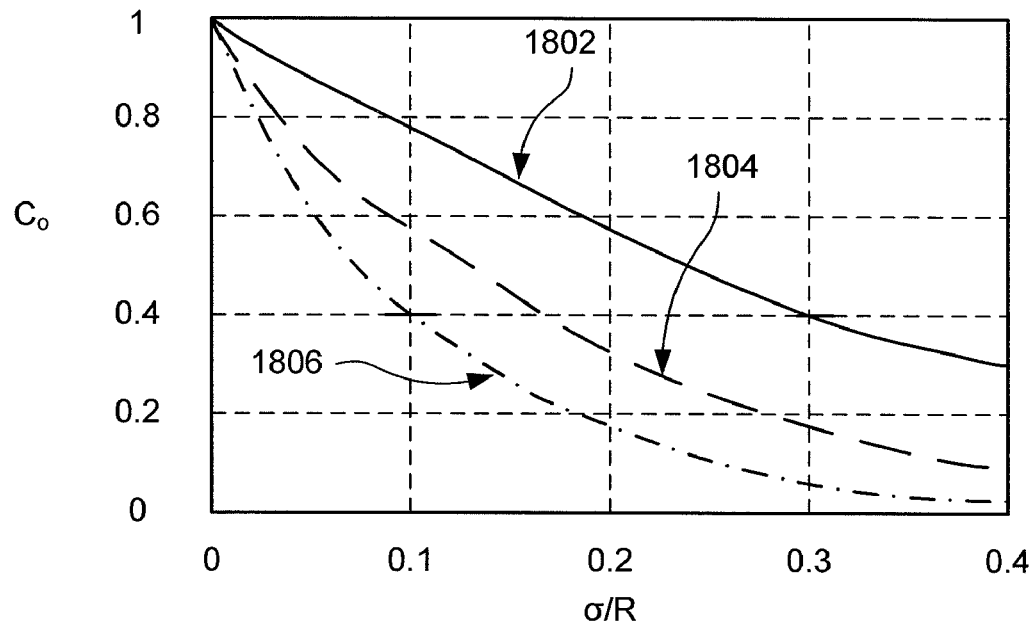
FIG. 18 is a graph of the roughness metric of the fifth process for an exemplary hole pattern.

FIG. 18 illustrates several graphs of $C_O$ with different values for the predetermined constant M. In particular, plot 1802 has a constant of M equal to 3, plot 1804 has a constant of M equal to 6, and plot 1806 has a constant of M equal to 9. The predetermined constant is selected to obtain a high sensitivity (i.e., steep slope of the curve) based on the anticipated or actual region of standard deviation divided by pattern size (e.g., $\sigma/R$). For example, in the case that $\sigma/R$ of the observed sample is in the range of 0 to 0.1, a predetermined constant, M, of 9 yields a higher sensitivity than a predetermined constant, M, of 3. In the case that $\sigma/R$ is from 0.1 to 0.2, a predetermined constant, M, of 6 or 9 may yield better sensitivity than a predetermined constant, M, of 3. For $\sigma/R$ in the range from 0.2 to 0.3, a predetermined constant, M, of 3 or 6 may yield better sensitivity. When $\sigma/R$ is larger than 0.3, a predetermined constant, M, of 3 may yield the best results.

As with the first embodiment, the auto-correlation function is evaluated to determine the value for the length which yields the desired constant, $A_O$, in step 1708 (see equations (8)-(10) above). The resulting length, $\xi$, is selected as the width index in step 1710. The roughness index is computed in step 1712 as the ratio of the height index to the width index. As is evident, larger values for the height index indicate that a spoke extends farther from the ideal shape while smaller values of the width index indicate that a spoke is narrower. Thus, larger values of the roughness index represent spokes which are relatively large and/or sharp.

The process proceeds to step 1714 wherein the concavity parameter, $\phi$, is determined. When using the normalized variance, $C_O$, as the height index, the concavity parameter is determined from the skewness of the deviation distribution. Thus, the concavity parameter, $\phi$, is calculated in step 1714 according to:

$$\varphi = \sum_{i=1}^{m} \frac{(\Delta r_i)^3}{m\sigma^3}. \quad (18)$$

In step 1716, the value of the concavity parameter, $\phi$, is evaluated. If the concavity parameter is greater than zero (i.e., skewness>0), this indicates that the pattern has convex spokes. The process advances to step 1718 wherein the pattern is labeled as convex. If the concavity parameter is less than or equal to zero (i.e., skewness≤0), this indicates that the pattern has concave or no spokes. The process advances to step 1720 wherein the pattern is labeled as concave.

Figure 19:
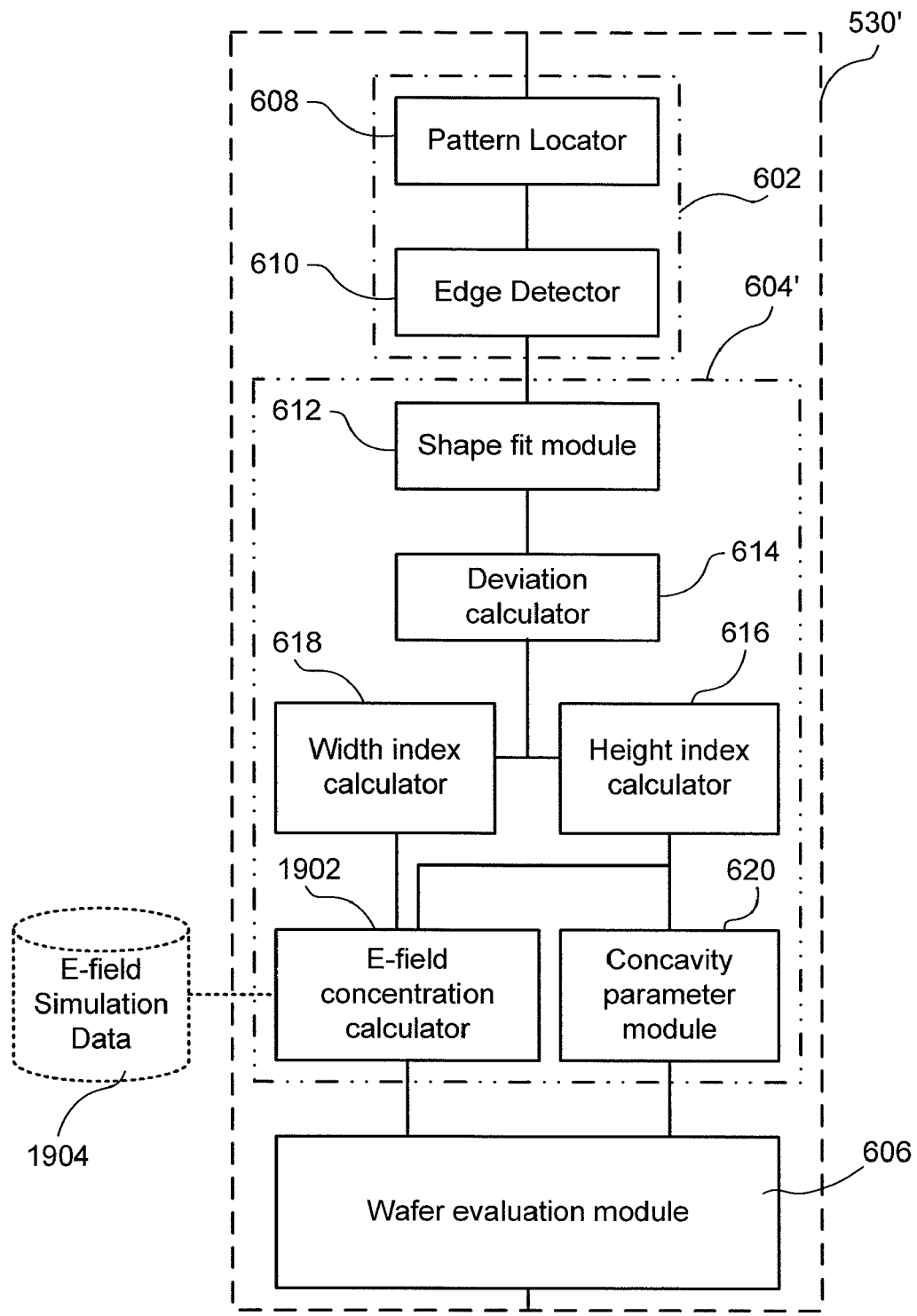
FIG. 19 is a schematic diagram of another failure analysis module for use in the measurement system of FIG. 5.

An alternative embodiment for the failure analysis module is shown in FIG. 19. Failure analysis module 530' includes a variety of sub-modules, in particular, an image processing module 602, a pattern evaluation module 604', and a wafer evaluation module 606. In contrast to failure analysis module 530 of FIG. 6, the pattern evaluation module calculates an electric field (E-field) concentration instead of or in addition to a roughness index.

Similar to the pattern evaluation module 530 of FIG. 6, the pattern evaluation module 604' of FIG. 19 includes a shape fitting module 612, a deviation calculation module 614, a height index module 616, a width index module 618, and a concavity parameter module 622. In place of roughness metric calculation module 620 is an E-field concentration calculation module 1902. The E-field concentration calculation module 1902 uses the calculated height and width indices to determine an E-field concentration for the CER of the pattern.

Figure 20:
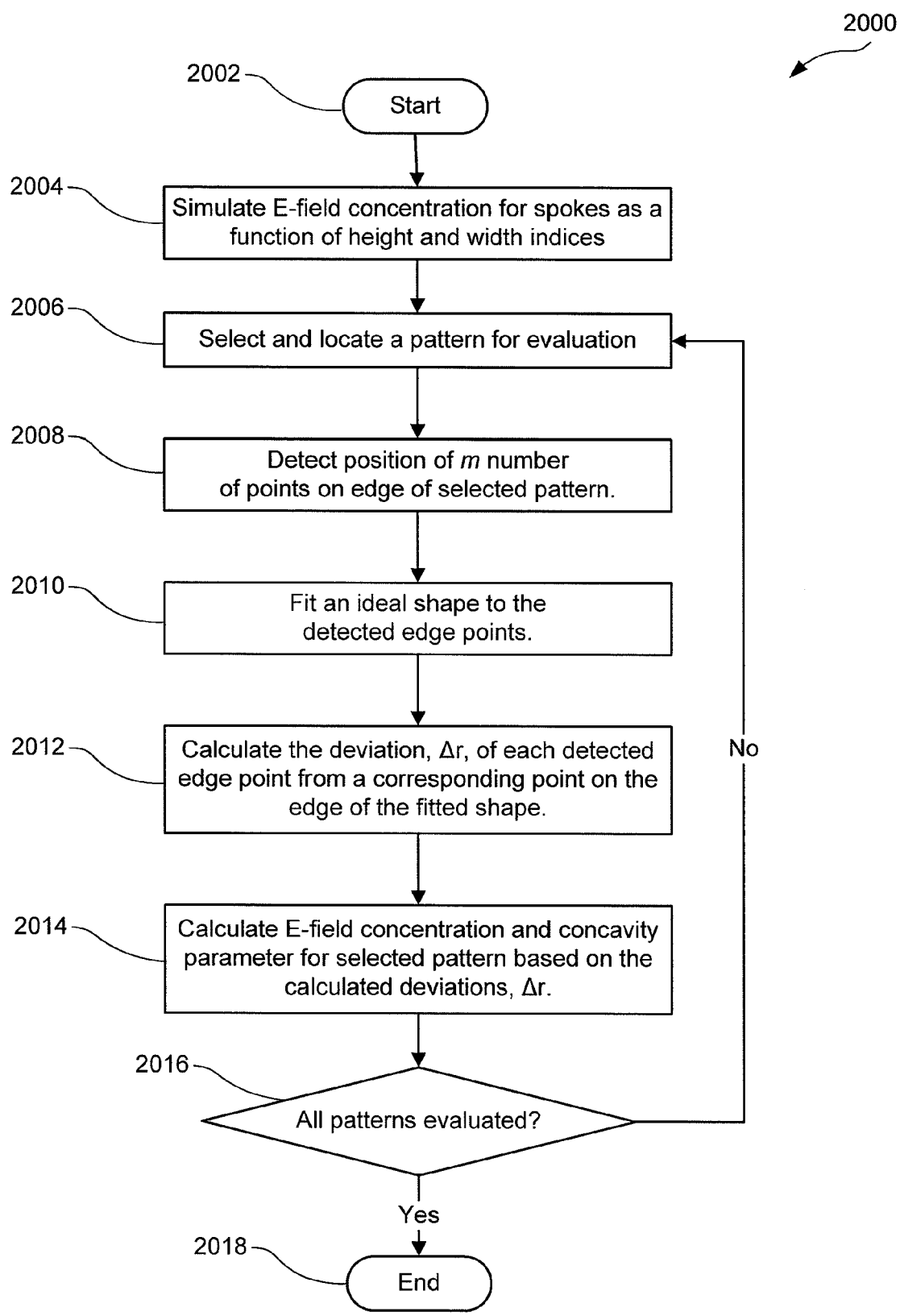
FIG. 20 is a process flow diagram illustrating other steps for evaluating the patterns in an image of the patterns, according to one or more embodiments.
Figure 22:
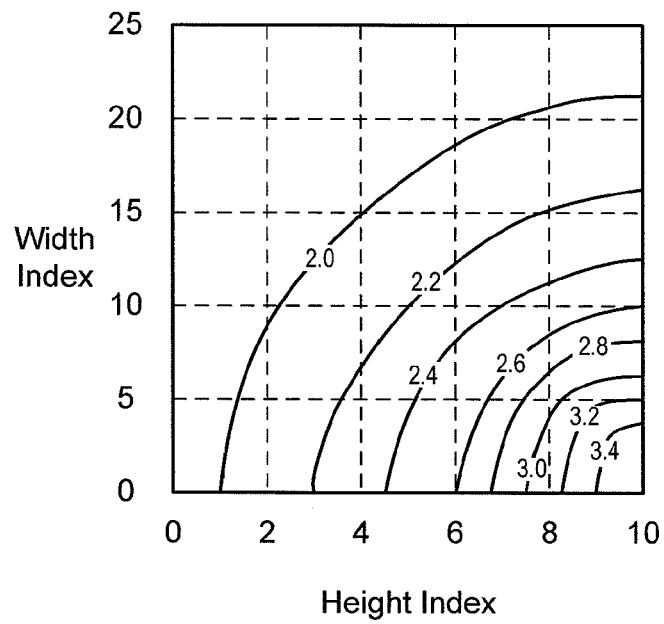
FIG. 22 is a graph of an electric field map based on height and width indices for a particular pattern.

Referring to FIG. 20, an exemplary process 2000 for execution by the failure analysis module 530' is shown. The process starts at 2002 and proceeds to step 2004. In step 2004, E-field concentrations are determined for spokes based on a variety of different height and width indices. The E-field concentration is determined by simulations, for example. The results of the simulation are stored, for example, as a map or contour plot based on height and width indices as shown in FIG. 22. The process proceeds to step 2006.

In step 2006, an image of the wafer is processed for a specific pattern. A user may select one of the patterns in the image, or the module may select a pattern for analysis based on a predetermined routine or map associated with the CD evaluation process. Alternatively, the pattern may be located using pattern recognition or from a predetermined protocol. The pattern is thus located in the image for further processing.

At step 2006, the module detects the edge of the selected pattern. In particular, coordinates of a plurality (m) of points on the edge of the imaged pattern are located. For example, the points may be equally spaced on the circumference of the imaged pattern. The spacing may be chosen so as to provide sufficient discrimination based on the anticipated CER and size of the imaged pattern.

At step 2008, the module fits an ideal shape, such as a closed two-dimensional shape, to the detected edge points. The process 2000 proceeds to step 2010. In step 2012, the module 530' calculates a deviation between corresponding points on the formed pattern and on the fitted shape. This deviation is determined, for example, in a manner similar to that described above with respect to the other embodiments.

The process 2000 proceeds to step 2012. In step 2012, the module calculates a roughness metric and a concavity parameter for the formed pattern based on the calculated deviations for each point on the formed pattern edge. The process then proceeds to step 2014 where it is determined if all relevant patterns have been evaluated. The number of relevant patterns can include a sampling of the total patterns on the wafer or of the total patterns in a chip on the wafer. Alternatively, the number of relevant patterns includes all patterns in a chip or subset of chips on the wafer. In yet another alternative, the number of relevant patterns includes all the patterns on the wafer. In still another alternative, all or a portion of the patterns on the wafer that are particularly susceptible to failure, either because of function or size, are evaluated. The process 2000 repeats steps 2006 through 2014 until all relevant patterns have been evaluated, at which point the process terminates at 2018.

Figure 21:
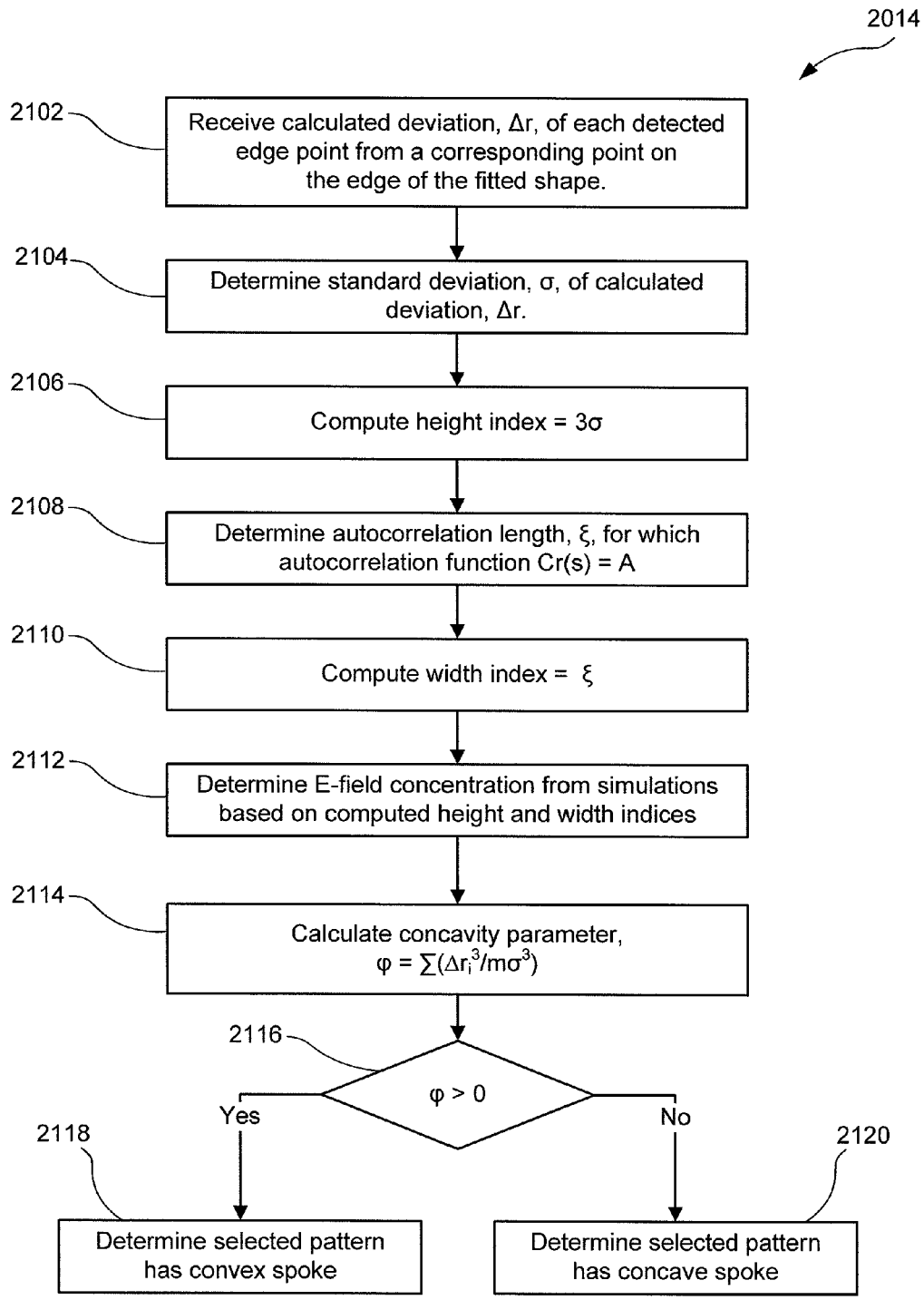
FIG. 21 is a process flow diagram illustrating steps of a process for calculating the electric field concentration and a concavity parameter for a particular hole pattern.

For example, step 2014 includes the process steps illustrated in FIG. 21. The deviations, $\Delta r_i$, of each edge point of the formed pattern from the corresponding edge point of the fitted shape are received in step 2102. For example, height and width index calculators 616, 618 receive this information from deviation calculator 614 in FIG. 19.

The height index is determined as a multiple of the standard deviation of the deviation distribution. For example, the height index is $3\sigma$ (see equation (7) above). Thus, in step 2104, the standard deviation, $\sigma$, is determined followed by the determination of the height index in step 2106.

In step 2108, the auto-correlation function, $Cr(s)$, is evaluated to determine the value for the length which yields the desired constant, $A_O$, in step 2108 (see equations (8)-(10) above). The resulting length, $\xi$, is selected as the width index in step 2110.

In step 2112, the E-field concentration for the pattern is determined. The E-field concentration is a function of the calculated height and width indices. The E-field concentration is based on simulated data for a variety of height and width indices. For example, a region of height and width indices which may result in fatal E-field concentrations for a particular pattern and/or semiconductor devices are obtained by simulation in step 2004. Using the results of the simulation, a contour map is constructed that visually shows detrimental areas as cross-hatched region 2302 in FIG. 23. The cross-hatched region of FIG. 23, where the height index is more than 8 nm and the width index is less than 15 nm, indicates that it is highly likely an interconnect property of the pattern may be degraded.

Figure 23:
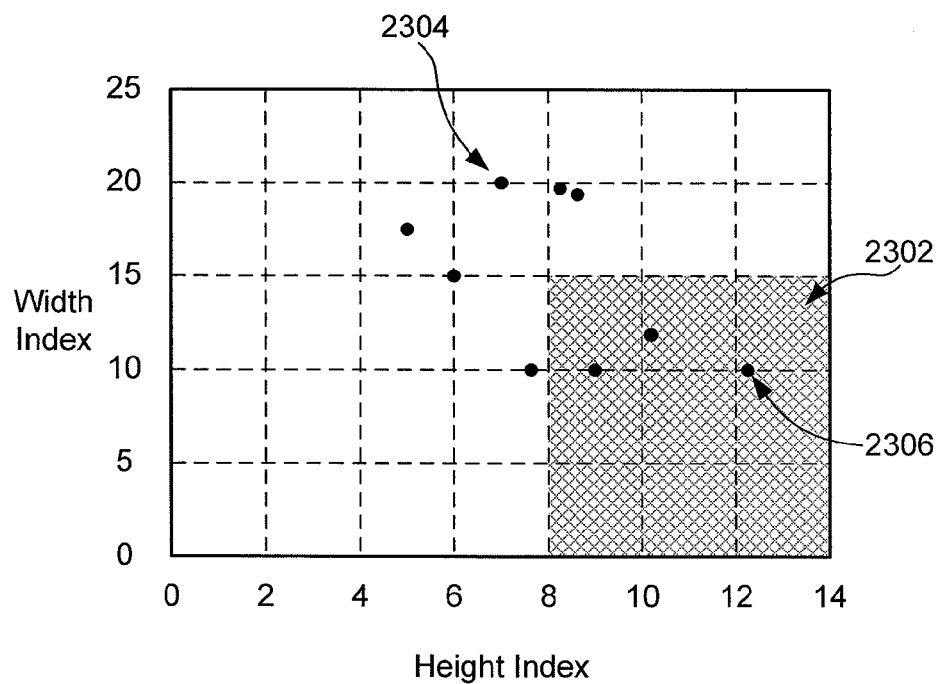
FIG. 23 is a graph showing a number of exemplary height and width indices on an electric field map.

In step 2112, using the height and width indices, the E-field concentration is extracted from the map data in FIG. 23. The extracted E-field concentrations plotted in FIG. 23 show three patterns 2306 which are likely to have potentially fatal E-field concentrations, while patterns 2304 may only experience nonfatal E-field concentrations.

The process proceeds to step 2114 wherein a concavity parameter, $\phi$, is determined. The concavity parameter, $\phi$, is used to determine if the spoke or spokes along the edge of a formed pattern are concave or convex. As discussed above, convex spokes are of particular interest whereas concave spokes may not negatively affect device performance. When using $3\sigma$ as the height index, the concavity parameter, $\sigma$, is determined from the skewness of the deviation distribution (see equation (11) above).

In step 2116, the value of the concavity parameter, $\phi$, is evaluated. If the concavity parameter is greater than zero (i.e., skewness>0), this indicates that the pattern has convex spokes. The process advances to step 2118 wherein the pattern is labeled as convex. If the concavity parameter is less than or equal to zero (i.e., skewness$\leq$0), this indicates that the pattern has concave or no spokes. The process advances to step 2120 wherein the pattern is labeled as concave.

The E-field map could be used to determine the yield of a pattern or chip in a semiconductor device. For example, the production yield may not be sufficiently high if 20% or more of the observed patterns are in region 2302 of the E-field contour map. Therefore, an inspected wafer is sent to the next step in a manufacturing process only when fewer than three patterns are in region 2302. Since the example illustrated in FIG. 23 has three patterns out of nine patterns in unacceptable E-field concentration region 2302, the wafer is sent to a recycle process instead of proceeding in the manufacturing process.

Process 700 and the accompanying variations for determining roughness metrics (or E-field concentration) and/or concavity parameters described with reference to FIGS. 12-17 and 20-21 above generally apply to one or more patterns for a semiconductor device, such as an integrated circuit or chip, formed on/in a wafer. However, a wafer 2400 may contain a plurality of individual chips 2402, which may be identical to or different from each other. In a quality control process, each pattern in each chip 2402 on the wafer 2400 is inspected to determine the deviation of each pattern from its ideal shape. The resulting deviations are then analyzed to produce a roughness index (or E-field concentration) and/or concavity parameter for each pattern, which is further analyzed by wafer evaluation module 606. Analysis by wafer evaluation module 606 includes determination of a wafer index and/or determining if a threshold number of unacceptable roughness index values is exceeded. The wafer index is representative of the general roughness (or E-field concentration) of the patterns on the wafer. A quality control process may use the wafer index in deciding if the wafer should be rejected due to poor pattern fidelity.

In some designs, it is impractical to inspect each pattern on the wafer due to the sheer volume of patterns thereon. Accordingly, a sampling of the chips on the wafer 2400, such as chips 2404, is selected for inspection while chips 2402 are not inspected, thereby significantly reducing inspection time. Chips 2404 may be randomly selected or symmetrically arranged around wafer 2400. As discussed above, convex spokes in patterns are more likely to result in performance degradation of the resulting semiconductor device. Whether based on all patterns on the wafer or a representative subset of the patterns on the wafer, the roughness index for patterns, which have been labeled as concave or have a concavity parameter indicative of concave spokes, is ignored or discarded in the generation of the wafer index. For example, the roughness index for a pattern having a concave spoke is reset to zero.

Figure 24:
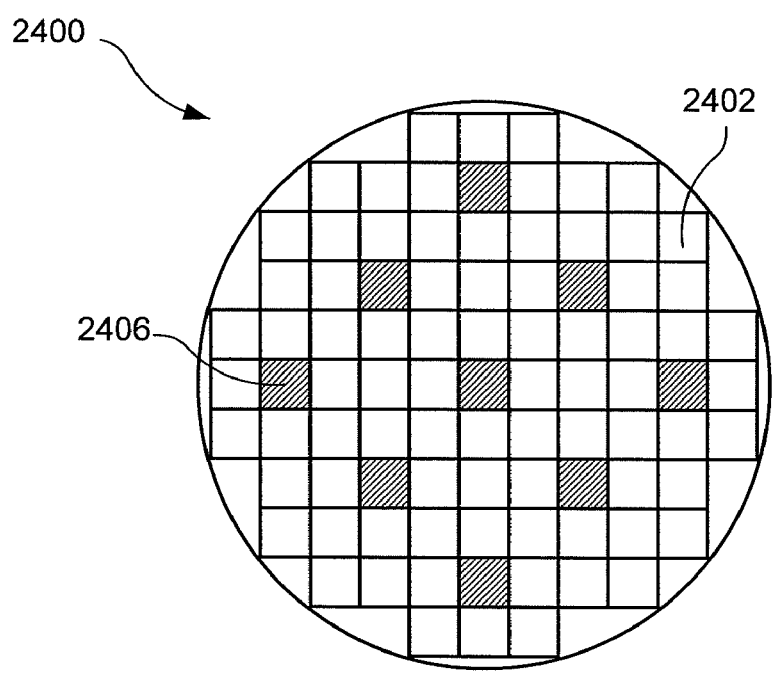
FIG. 24 is a simplified schematic showing a layout of chips on a wafer to be analyzed.

With reference to FIG. 24, a process 2500 for evaluation of a wafer 2400 is shown. The process 2500 begins at step 2502 and proceeds to step 2504. In step 2504, a measurement position on wafer 2400 is selected. The measurement position can be one of the chips 2404 on the wafer 2400. The process then proceeds to step 2506. In step 2506, the roughness metrics (or E-field concentration) and concavity parameters for all or a sampling of the patterns at the measurement position are calculated. For example, step 2506 includes the process 700, discussed with respect to FIG. 7, and the accompanying variations, discussed with respect to FIGS. 12-17 and 20-21 above.

Figure 26:
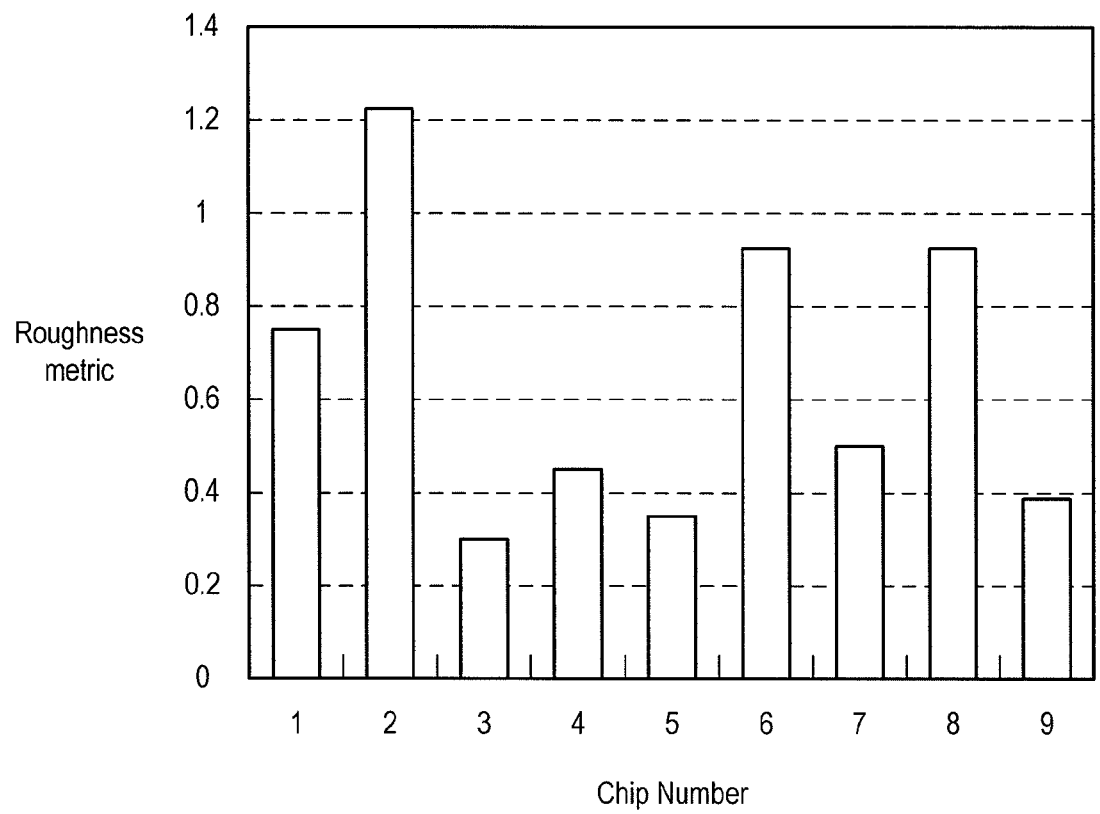
FIG. 26 is a graph of roughness metric according to the first process for different exemplary chips on a wafer.

In step 2508, the process checks if all measurement positions have been evaluated. If not, steps 2504-2508 are repeated for the next measurement position until all measurement positions on the wafer have been evaluated. The process proceeds to step 2510, wherein the wafer is evaluated based on the roughness metrics and concavity parameters. For example, nine chips 2404 on wafer 2400 are selected for inspection. The roughness metric for each hole pattern in a chip are averaged to generate a roughness metric for the entire chip. FIG. 26 shows an exemplary bar graph of the roughness metrics for inspected chips on the wafer. The wafer evaluation module determines that an inspected wafer is acceptable (and allowed to continue in a manufacturing process) if less than three of the inspected chips have an average roughness metric less than 0.8. Since three of the nine inspected chips in FIG. 26 exceed this 0.8 threshold, the wafer is deemed unacceptable. Thus, the wafer is prevented from continuing in the manufacturing process. Alternatively, the information regarding the roughness metric for each inspected chip may be conveyed to a user, such as by a display, for determination if the wafer should continue in the manufacturing process.

Alternatively, the wafer evaluation module 606 generates a wafer index, based on the roughness metric for the inspected patterns, to determine if the wafer should continue in the manufacturing process. For example, the wafer index is determined as the average of the measured roughness metrics for the inspected patterns.

In another example, the wafer index is determined from the standard deviation of the roughness metrics for the inspected patterns. The wafer index may be $3\sigma_w$, where $\sigma_w$ represents the standard deviation of the roughness metric for the inspected patterns on each chip.

In yet another example, the wafer index is the number of inspected patterns for which the roughness metric exceeds a predetermined threshold. For FIG. 26, such a wafer index would be 3 for a threshold value 0.8. The threshold value can be determined experimentally or from the measured roughness metrics. For example, the threshold value, $R_{th}$, may be determined as a multiple of the standard deviation of the roughness metrics for the inspected patterns, such as $2\sigma_w$.

Figure 27:
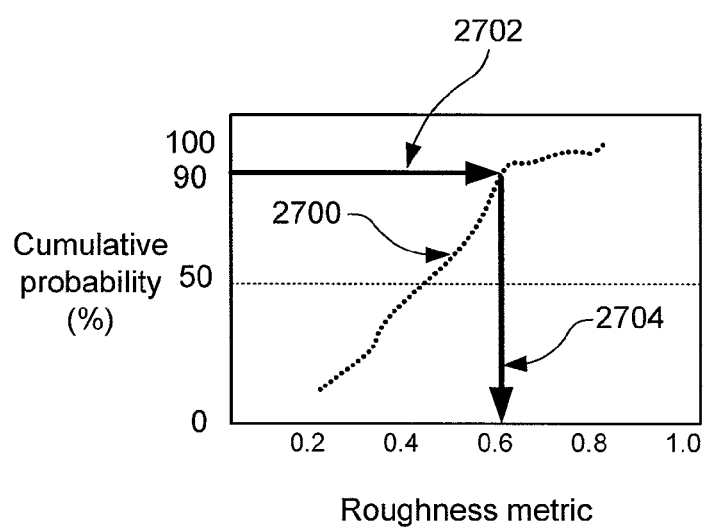
FIG. 27 is a cumulative probability graph of roughness metrics of the first process for different exemplary chips on a wafer.

In still another example, the wafer index is based on a cumulative probability plot. The wafer index is determined as a selected value of the determined roughness metrics for which X percentage (i.e., the cumulative probability) of the roughness metrics are less than the selected value. Referring to FIG. 27, the roughness metrics 2700 for the wafer extend from around 0.2 to around 0.9. A cumulative probability of 90%, indicated by arrow 2702, signifies that 90% of the measured roughness metrics are less than a value of about 0.62, as indicated by arrow 2704.

The wafer index thus provides an indicator of the quality of the patterns in/on the wafer. Such an indication is particularly useful when the patterns have not been permanently formed on the wafer. For example, in photolithography, photoresist patterns are temporarily formed on the semiconductor wafer as a template for subsequent material addition or deletion steps. If the pattern quality is unacceptable, the wafer may be recycled by removing and then re-applying the photoresist pattern.

Figure 28:
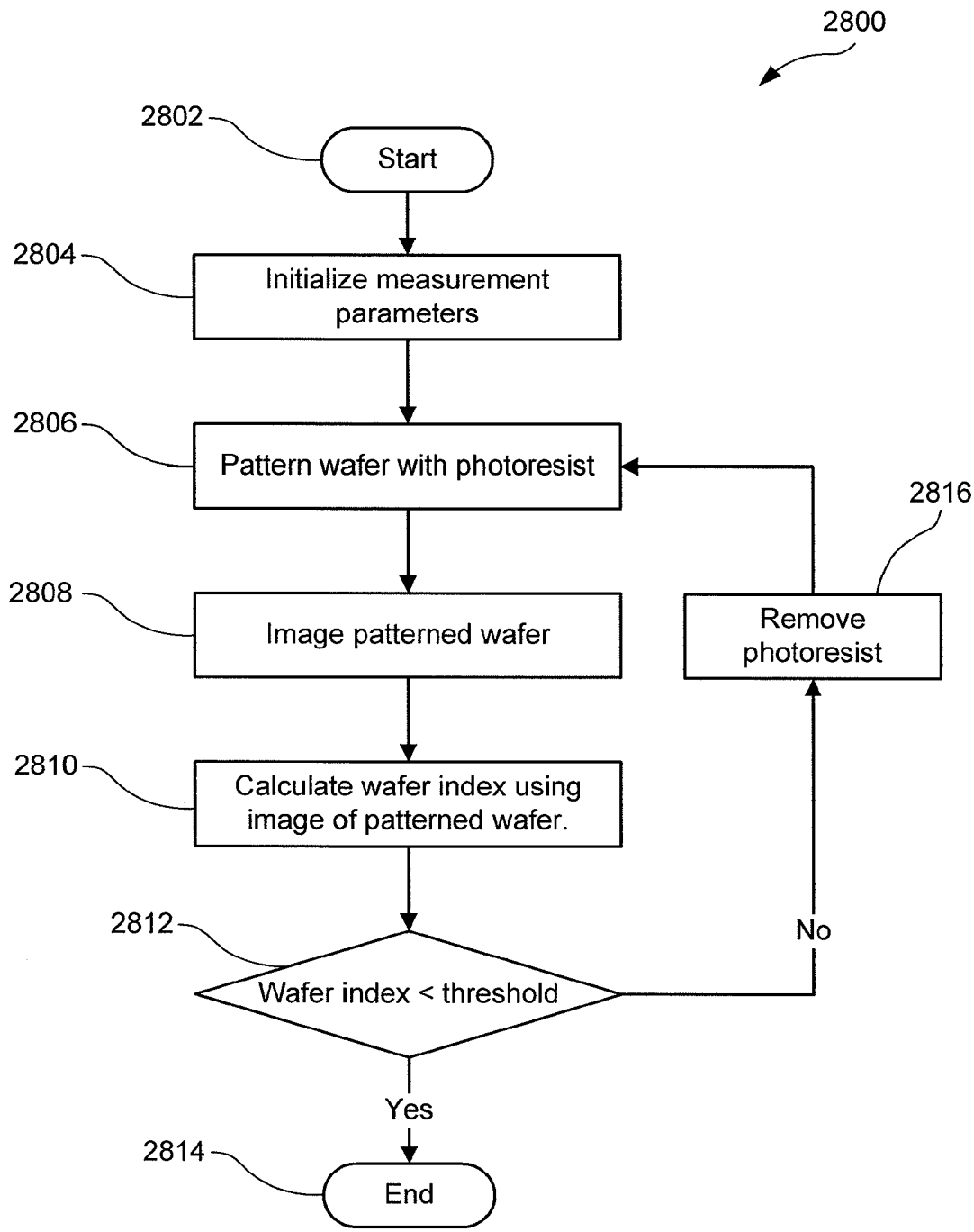
FIG. 28 is a process flow diagram illustrating steps of a process for patterning a wafer and evaluating the pattern on the wafer.

A measurement evaluation process 2800 for use in inspecting photoresist patterns on a wafer as part of a semiconductor device fabrication process is shown in FIG. 28. The process begins at step 2802 and process to step 2804. At step 2804, the measurement parameters are initialized. Initialization may include determining the locations and/or quantity of measurement positions or individual patterns for inspection. Initialization may also include a determination of wafer index evaluation criteria, such as a threshold number.

The process proceeds to step 2806. In step 2806, a photoresist pattern is formed on the wafer using, for example, conventional photolithography. The photoresist pattern may be formed using other pattern transfer technologies, such as, but not limited to, LIGA, e-beam lithography, and EUV lithography. After the pattern is formed, the process proceeds to step 2808 wherein the formed pattern is imaged. The pattern may be imaged using, for example, a CD-SEM or other imaging apparatus capable of resolving the roughness features of the photoresist pattern.

Figure 25:
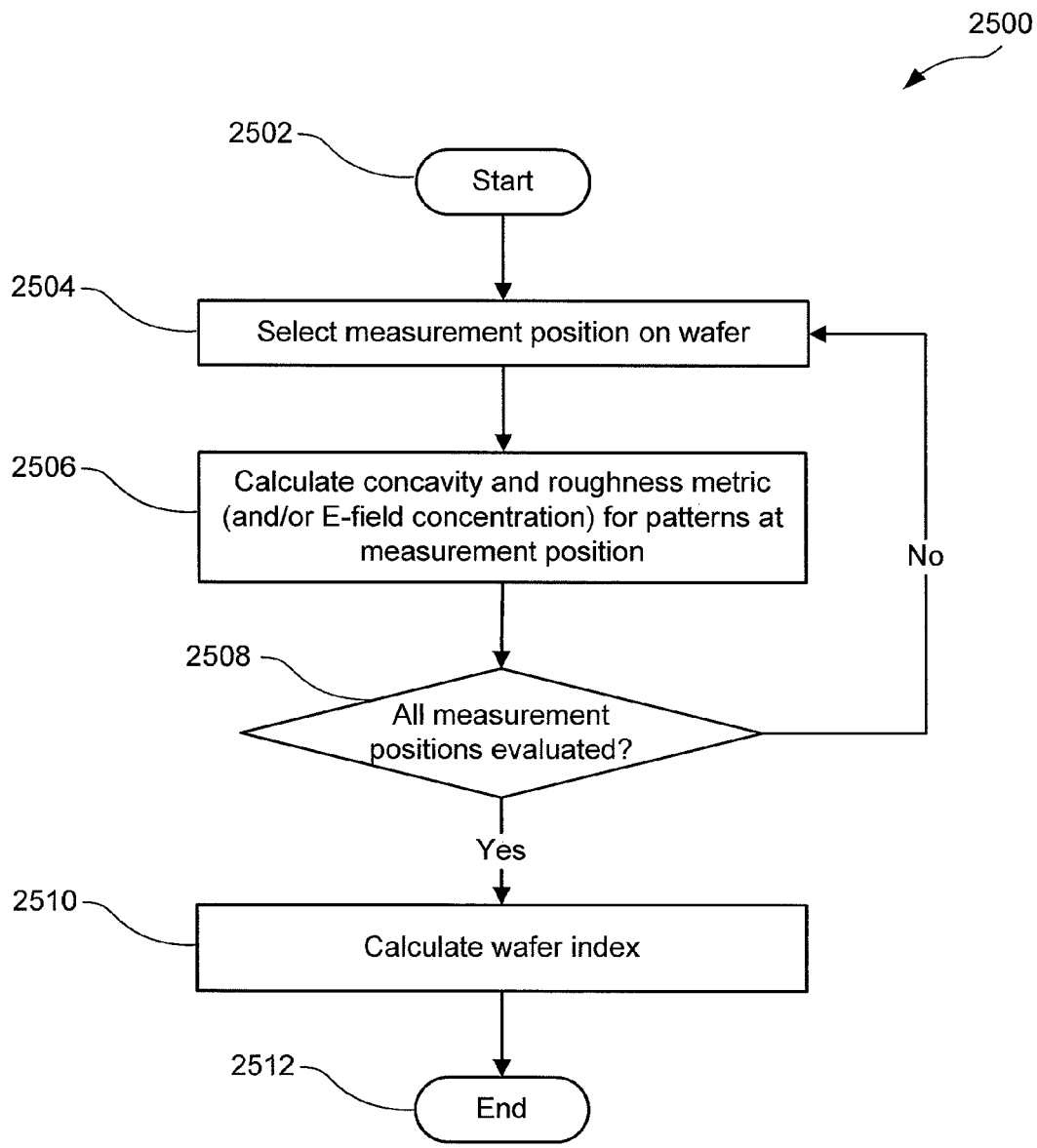
FIG. 25 is a process flow diagram illustrating steps of a process for evaluating the patterns on a wafer.

Advancing to step 2810, the process calculates a wafer index based on the image of the patterned wafer. Step 2810 employs process 2500 of FIG. 25. The resulting wafer index is compared with the predetermined threshold value in step 2812. If the wafer index is less than the threshold value, this indicates that the pattern roughness is within an acceptable amount and may not significantly affect device performance. The wafer is thus allowed to proceed to the next step in the manufacturing process, and the process 2800 terminates at step 2814. However, if the wafer index is greater than the threshold value, this indicates that the pattern roughness is unacceptable and may significantly alter device performance. Thus, the wafer is recycled by removing the photoresist in step 2816. Steps 2806-2812 may be repeated until an acceptable pattern is achieved.

The embodiments described herein have been chosen to best illustrate the principles of the invention and its practical application and to thereby enable others skilled in the applicable arts to utilize the invention. Various embodiments with various modifications depending on the particular use are contemplated. It is thus intended that the scope of the invention be defined by the Claims appended hereto and their equivalents.

The invention claimed is:

1. A system for evaluating a hole pattern in a semiconductor device pattern, the system comprising:
an image processing module configured to extract position information of an edge of the hole pattern from a critical dimension scanning electron microscope (CD-SEM) image of the semiconductor device pattern; and
a pattern evaluation module for calculating a roughness metric and a concavity parameter of the hole pattern, the pattern evaluation module being configured to fit a shape to a plurality of points on the edge of the hole pattern and to determine a deviation for each of the plurality of points from a corresponding point on an edge of the fitted shape, to calculate a height index and a width index based on the deviations, to calculate a concavity parameter based on the extracted position information, and to calculate a roughness metric for the hole pattern based on the calculated height index and width index.

2. The system according to claim 1,
wherein the roughness metric is a sharpness parameter equal to the height index divided by the width index.

3. The system according to claim 1,
wherein said position information includes positions of said plurality of points on the edge of the hole pattern, and said fitted shape is an ellipse.

4. The system according to claim 3,
wherein the width index is a length, $\xi$, for which an autocorrelation function applied to the deviation in a height direction along the circumference of the fitted shape has a value of 0.2.

5. The system according to claim 3, wherein
the height index is based on a standard deviation, $\sigma$, of the determined deviations, $\Delta r_i$, for the hole pattern,
the concavity parameter, $\phi$, is given by:

$$\varphi = \sum_{i=1}^{m} \frac{\Delta r_i^3}{m\sigma^3},$$

where m is the number of the plurality of points on the edge of the hole pattern, and
the pattern evaluation module is configured to determine a concave hole pattern when $\phi \leq 0$ and a convex hole pattern when $\phi > 0$.

6. The system according to claim 3, wherein
the height index is the absolute value of $\Delta r_{max}$,
where $\Delta r_{max}$ is one of the determined deviations which has the greatest absolute value of the determined deviations, and
the pattern evaluation module is configured to determine a concave hole pattern when $\Delta r_{max} \leq 0$ and a convex hole pattern when $\Delta r_{max} > 0$.

7. The system according to claim 3, wherein
the height index is $\Delta R(x)$,
where $\Delta R(x)$ is one of the determined deviations, $\Delta r$, For which the Rank($\Delta r$)/m is closest to x, m is the number of the plurality of points on the edge of the hole pattern, and x is a predetermined value,
the concavity parameter, $\phi$, is given by:

$$\phi = x'(\Delta R(x')=0),$$

where x' is a normalized ranking of one of the determined deviations that has a value closest to zero, and
the pattern evaluation module is configured to determine a concave hole pattern when $\phi \geq x$ and a convex hole pattern when $\phi < x$.

8. The system according to claim 3, wherein
the height index is $\Delta R_{cp}(X)$,
where $\Delta R_{cp}(X)$ is one of the determined deviations for which X percentage of the determined deviations have magnitudes less than or equal to a magnitude of said one of the determined deviations, and X is a predetermined value,
the concavity parameter, $\phi$, is given by:

$$\phi = X'(\Delta R_{cp}(X')=0),$$

where X' is the percentage of determined deviations that have a magnitude equal to or less than zero, and
the pattern evaluation module is configured to determine a concave hole pattern when $\phi \geq X$ and a convex hole pattern when $\phi < X$.

9. The system according to claim 3, wherein the height index is given by:

$$C_0 = \exp\left(\frac{-M\sigma}{R}\right),$$

where M is a predetermined integer, $\sigma$ is the standard deviation of the determined deviations, and R is an average radius of the fitted shape.

10. The system according to claim 9, wherein
the pattern evaluation module is configured to determine a concave hole pattern when $\phi \leq 0$ and a convex hole pattern when $\phi < 0$, where the concavity parameter, $\phi$, is:

$$\varphi = \sum_{i=1}^{m} \frac{\Delta r_i^3}{m\sigma^3},$$

m being the number of said points on the edge of the hole pattern, and $\sigma$ is the standard deviation of the determined deviations, $\Delta r_i$, for the hole pattern.

11. The system according to claim 2, wherein
the semiconductor device pattern includes a plurality of hole patterns,
the image processing module is configured to extract position information of an edge of each of the hole patterns,
the pattern evaluation module is configured to compute an individual roughness metric and a concavity parameter for each of the hole patterns, and
further comprising a wafer evaluation module configured to compare a cumulative probability of the roughness metrics of the hole patterns for an entire wafer to a predetermined value.

12. The system according to claim 11, wherein
the semiconductor device pattern is formed in a photoresist film, and
the wafer evaluation module sends out a notice to a user if the cumulative probability exceeds the predetermined value.

13. The system according to claim 1,
wherein at least one of the image processing module and the pattern evaluation module is part of a CD-SEM system.

\* \* \* \* \*